US008162380B2

(12) United States Patent
Sumitani et al.

(10) Patent No.: US 8,162,380 B2
(45) Date of Patent: Apr. 24, 2012

(54) AERODYNAMIC STRUCTURE FOR VEHICLE

(75) Inventors: Keiji Sumitani, Aichi (JP); Hiroyuki Nakaya, Toyota (JP); Toshiyuki Murayama, Nagoya (JP); Eishi Takeuchi, Toyota (JP); Kazunori Oda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 539 days.

(21) Appl. No.: 12/293,659

(22) PCT Filed: Dec. 28, 2006

(86) PCT No.: PCT/JP2006/326266
§ 371 (c)(1),
(2), (4) Date: Sep. 19, 2008

(87) PCT Pub. No.: WO2007/119270
PCT Pub. Date: Oct. 25, 2007

(65) Prior Publication Data
US 2010/0156142 A1     Jun. 24, 2010

(30) Foreign Application Priority Data

Mar. 22, 2006  (JP) ................................. 2006-079179

(51) Int. Cl.
*B62D 35/00* (2006.01)
(52) U.S. Cl. .................................................. 296/180.1
(58) Field of Classification Search ............... 296/180.1, 296/198, 208, 180.5, 204; 180/903, 181; 280/848, 850, 851; D12/169, 88; *B62D 35/00*
See application file for complete search history.

(56) References Cited

U.S. PATENT DOCUMENTS

| | | | | | |
|---|---|---|---|---|---|
| 5,277,444 | A | * | 1/1994 | Stropkay | 280/848 |
| 5,460,411 | A | * | 10/1995 | Becker | 280/851 |
| 5,820,203 | A | * | 10/1998 | Morelli et al. | 296/180.1 |
| 6,712,425 | B2 | * | 3/2004 | Brulhart | 296/180.1 |
| 6,719,359 | B2 | * | 4/2004 | Steinicke et al. | 296/180.1 |
| 6,799,782 | B2 | * | 10/2004 | Jain et al. | 280/848 |
| 7,198,139 | B2 | * | 4/2007 | Wilson et al. | 188/264 AA |

(Continued)

FOREIGN PATENT DOCUMENTS

DE          195 40 259          11/1996

(Continued)

OTHER PUBLICATIONS

Notice of Request for Submission of Opinions for Korean Appl. No. 2008-7025761 dated Mar. 29, 2010.

(Continued)

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP

(57) ABSTRACT

An aerodynamic device for a vehicle that can effectively adjust airflow within a wheel house is obtained. A fixed aerodynamic stabilizer device 10 is formed at a vehicle body longitudinal direction rear side of a rotational axis of a front wheel 15 within a wheel house 16, as a step having an airflow collision groove wall that faces downward in a vehicle body vertical direction. This fixed aerodynamic stabilizer device 10 suppresses flowing-in, into the wheel house 16, of airflow F that is generated accompanying the front wheel 15 rotating in a direction of arrow R.

28 Claims, 17 Drawing Sheets

U.S. PATENT DOCUMENTS

| | | | |
|---|---|---|---|
| 2002/0109347 A1* | 8/2002 | Sheppard | 280/851 |
| 2003/0173798 A1* | 9/2003 | Steinicke et al. | 296/180.1 |
| 2007/0182207 A1* | 8/2007 | Nakaya | 296/180.1 |

FOREIGN PATENT DOCUMENTS

| | | |
|---|---|---|
| EP | 0 626 308 | 11/1994 |
| EP | 0 769 422 | 4/1997 |
| GB | 2 265 875 | 10/1993 |
| GB | 2 300 396 | 11/1996 |
| JP | 3-102386 | 10/1991 |
| JP | 6-144296 | 5/1994 |
| JP | 6-156327 | 6/1994 |
| JP | 8-216929 | 8/1996 |
| JP | 10-278854 | 10/1998 |
| JP | 2003-528772 | 9/2003 |
| JP | 2006-69396 | 3/2006 |
| KR | 1998-073253 | 11/1998 |
| KR | 1020050037152 | 4/2005 |
| WO | WO 2005/070749 | 8/2005 |

OTHER PUBLICATIONS

Extended European Search Report for EP 06843644, dated Aug. 10, 2009.

* cited by examiner

FIG. 3
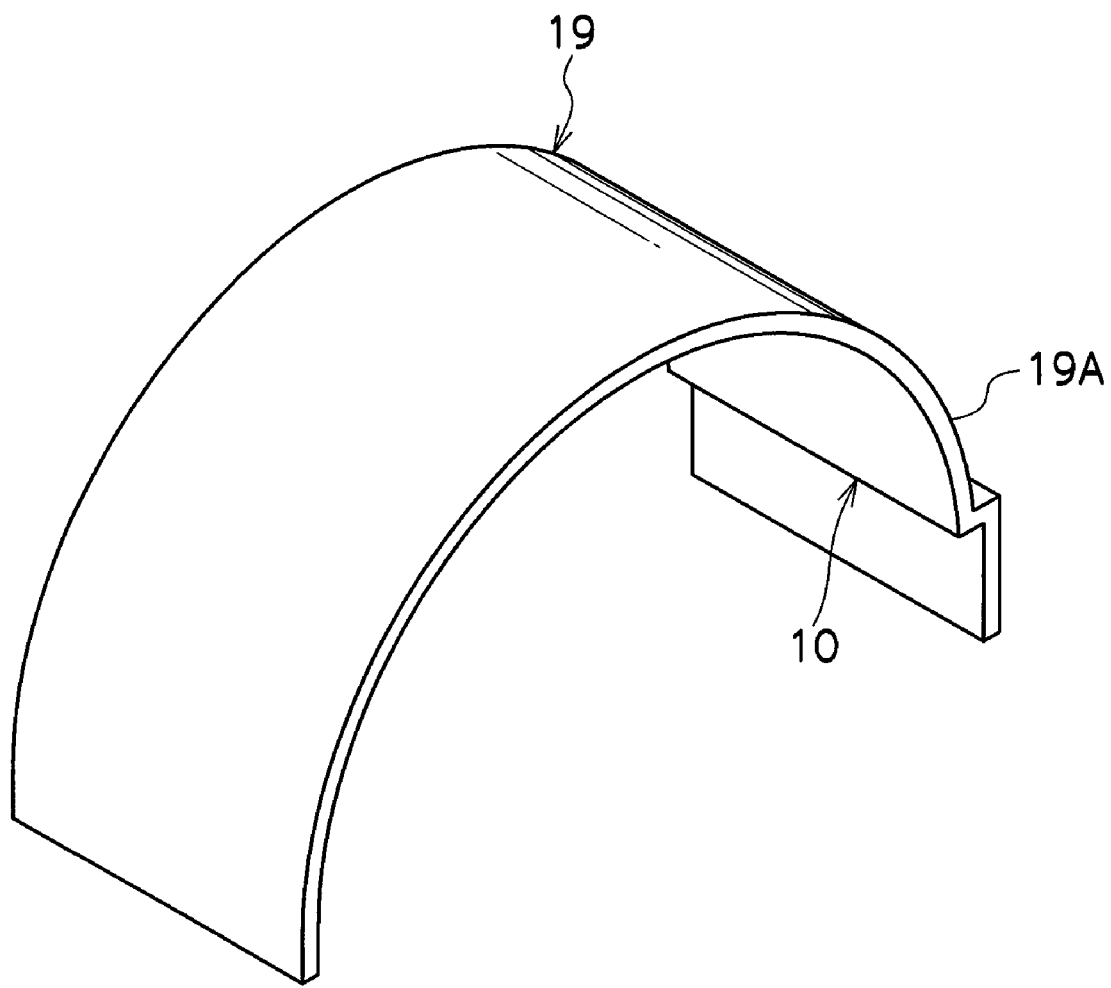
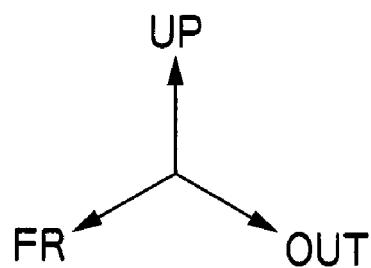

AERODYNAMIC STRUCTURE FOR VEHICLE

CROSS-REFERENCE TO RELATED APPLICATIONS

This application is a national phase application of International Application No. PCT/JP2006/326266, filed Dec. 28, 2006, and claims the priority of Japanese Application No. 2006-079179, filed Mar. 22, 2006, the contents of both of which are incorporated herein by reference.

TECHNICAL FIELD

The present invention relates to an aerodynamic structure for a vehicle for adjusting airflow within a wheel house.

BACKGROUND TECHNOLOGY

There is known a technique of providing an aerodynamic stabilizer that projects-out within the wheel house of an automobile, and improving the driving stability and brake cooling performance by this aerodynamic stabilizer (see, for example, Japanese Patent Application Laid-Open (JP-A) No. 2003-528772). Further, techniques that are described in Japanese Patent Application Laid-Open No. 8-216929, Japanese Patent Application Laid-Open No. 6-144296, Japanese Patent Application Laid-Open No. 6-156327, Japanese Patent Application Laid-Open No. 2006-69396, Japanese Utility Model Application Laid-Open No. 3-102386, and Japanese Patent Application Laid-Open No. 10-278854 are known.

DISCLOSURE OF THE INVENTION

Problem to be Solved by the Invention

However, in the conventional technique such as described above, because the aerodynamic stabilizer is always projecting-out within the wheel house, there are various limitations such as avoiding interference with the wheel and the like, and it is difficult to obtain satisfactory performances.

In view of the above-described circumstances, an object of the present invention is to provide an aerodynamic structure for a vehicle that can effectively adjust flow within a wheel house.

Method of Solving the Problem

An aerodynamic structure for a vehicle according to a first aspect of the present invention comprises, a step portion having an airflow collision groove wall that faces downward in a vehicle body vertical direction, the step portion being provided at a vehicle body longitudinal direction rear side of a rotational axis of a wheel within a wheel house, wherein the step portion further has an airflow guiding wall that extends downward in the vehicle body vertical direction from a vehicle body longitudinal direction rear end portion at the airflow collision groove wall.

By the above aspect, the airflow collision groove wall of the step portion, that faces downward in the vehicle body vertical direction at the vehicle body longitudinal direction rear side of the wheel, functions as a wind receiving surface with respect to the airflow that is directed toward the wheel house interior as the wheel rotates. Due thereto, flowing-in of air into the wheel house is suppressed. Further, because the step portion is positioned only at the rear of the rotational center of the wheel, flowing-in of air into the wheel house accompanying rotation of the wheel is suppressed at the upstream (entrance) side, and discharging, from the side, of the air that has flowed into the wheel house is suppressed.

Further, by the above aspect, the airflow that is generated at the radial direction outer side of the wheel accompanying rotation of the wheel is guided by the airflow guiding wall and is led to the airflow collision groove wall. Because the airflow guiding wall extends downward in the vehicle body vertical direction, sticking, accumulation of snow and ice can be suppressed while having the above-described function of guiding the airflow.

In this way, in the aerodynamic structure according to the above aspect, airflow within the wheel house can be adjusted effectively. Note that it is desirable to form the step portion at a member structuring the vehicle body (having a function other than adjusting airflow within the wheel house).

In an aerodynamic structure for a vehicle according to a second aspect of the present invention, an aerodynamic stabilizer for adjusting airflow that accompanies rotation of a wheel within a wheel house is formed, at a vehicle body longitudinal direction rear side of a rotational axis of a wheel, as a step portion that faces downward in a vehicle body vertical direction at a vehicle body structural member that extends along the vehicle body vertical direction, and the step portion further has an airflow guiding wall that extends downward in the vehicle body vertical direction from a vehicle body longitudinal direction rear end portion at the aerodynamic stabilizer.

By the above aspect, the aerodynamic stabilizer, that is a step portion that faces downward in a vehicle body vertical direction at a vehicle body longitudinal direction rear side, functions as a wind receiving surface with respect to the airflow that is directed toward the wheel house interior as the wheel rotates, and achieves the function of adjusting the airflow within the wheel house. Here, because the aerodynamic stabilizer is formed as a downward-facing step portion and does not have an upward-facing surface, sticking, accumulation of snow and ice does not arise, and these snow and ice are prevented from interfering with the wheel.

Further, by the above aspect, the airflow that is generated at the radial direction outer side of the wheel accompanying rotation of the wheel is guided by the airflow guiding wall and is led to the airflow collision groove wall. Because the airflow guiding wall extends downward in the vehicle body vertical direction, sticking, accumulation of snow and ice can be suppressed while having the above-described function of guiding the airflow.

In this way, in the aerodynamic structure according to the above aspect, airflow within the wheel house can be adjusted effectively.

In the above aspect, a configuration may be provided in which the step portion is provided along a vehicle width direction, and is disposed at a vehicle body longitudinal direction rear side of the wheel.

By the above aspect, because the step portion, that is provided along the vehicle width direction, is disposed at the rear of the wheel, flowing-in of air into the wheel house from the radial direction outer side of the wheel as the wheel rotates is effectively suppressed.

In the above aspect, a configuration may be provided in which the step portion is formed as a vehicle width direction groove that opens toward the wheel side, due to the airflow guiding wall being inclined so that a bottom end thereof in the vehicle body vertical direction is nearer to the wheel than a top end thereof.

By the above aspect, by inclining the air guiding wall with respect to the vehicle body vertical direction, the step portion is formed as a vehicle width direction groove that is long in the vehicle width direction and that faces the outer peripheral surface of the wheel. Therefore, the open plane of the step portion (the width direction groove) can be made to substantially coincide with the position of the inner surface of the wheel house in a case in which the step portion is not provided. Thus, the space between the end portions of the wheel and the inclined groove wall does not become too large, and the pressure rises at the periphery of the airflow collision groove wall that received the airflow generated accompanying the rotation of the wheel, and further, it is easy for this state of raised pressure to be maintained. Due to this rise in pressure at the periphery of the airflow collision groove wall, flowing-in of air into the wheel house can be suppressed even more effectively.

An aerodynamic structure for a vehicle according to a third aspect of the present invention comprises a width direction groove that is provided along a vehicle width direction only at a vehicle body longitudinal direction rear side of a rotational shaft of a wheel at an inner surface side of a wheel house at whose inner side the wheel is disposed, and that opens toward the wheel, the width direction groove being structured to have: a guide groove wall inclined from an edge portion of an open end that faces the wheel at the width direction groove, toward a downstream side in a direction of rotation of the wheel, so as to gradually move away from an outer peripheral surface of the wheel; and an airflow collision groove wall extending from an end portion side that is away from the outer peripheral surface of the wheel at the guide groove wall, toward another edge portion of the open end.

At a vehicle to which the aerodynamic structure for a vehicle of the above aspect is applied, airflow into the wheel house is generated from the rear of the wheel as the wheel rotates. A portion of this airflow is guided by the inclined groove wall and penetrates into the width direction groove, and collides with the airflow collision groove wall. Due thereto, the pressure at the periphery of the width direction groove rises, and flowing-in of air into the wheel house is suppressed. Further, because the width direction groove is positioned only at the rear of the rotational center of the wheel, the flowing-in of air into the wheel house that accompanies rotation of the wheel is suppressed at the upstream (entrance) side, and discharging, from the side, of the air that has flowed into the wheel house is suppressed.

Moreover, in the present aerodynamic structure for a vehicle, the open plane of the width direction groove can be made to substantially coincide with the position of the inner surface of the wheel house in a case in which the width direction groove is not provided. Thus, the space between the end portions of the wheel and the inclined groove wall does not become too large, and the effect of suppressing flowing-in of air into the wheel house due to the above-described rise in pressure is obtained reliably. On the other hand, because there is no fear of interference between the end portion of the inclined groove wall and the wheel, there are no limitations from the standpoint of aerodynamics for preventing this interference, and designing for obtaining a good effect of suppressing flowing-in of air is possible.

In this way, in the aerodynamic structure for a vehicle of according to the above aspect, airflow within the wheel house can be adjusted effectively.

In the above aspect, a configuration may be provided in which the width direction groove is provided at a vehicle body longitudinal direction rear end side at the wheel house and has the guide groove wall that extends rearward in a vehicle body longitudinal direction and upward in a vehicle body vertical direction from a vehicle body vertical direction bottom edge at the open end of the width direction groove, and the airflow collision groove wall that extends frontward in the vehicle body longitudinal direction from a top rear end of the guide groove wall.

By the above aspect, the width direction groove, that is provided at the rear end portion of the wheel house (at the rear end and in a vicinity of the bottom end portion that opens downward), guides the airflow that accompanies rotation of the wheel, rearward and upward at the inclined groove wall, and due to this airflow being made to collide with the airflow collision groove wall, the above-described rise in pressure is caused, and flowing-in of air into the wheel house can be suppressed. Further, because this effect of suppressing airflow arises at the upstream end portion of the airflow that accompanies rotation of the wheel at the wheel house, the effect of suppressing the flowing-in of airflow is good, and discharging, from the side, of the air that has flowed into the wheel house is suppressed even more effectively.

An aerodynamic structure for a vehicle according to a fourth aspect of the present invention comprises a width direction groove that is provided along a vehicle width direction at a portion that is positioned rearward, in a vehicle body longitudinal direction, of a wheel at an inner surface side of a wheel house at whose inner side the wheel is disposed, and that opens toward the wheel, wherein the width direction groove has a guide groove wall that extends rearward in a vehicle body longitudinal direction and upward in a vehicle body vertical direction from a vehicle body vertical direction bottom edge at an open end of the width direction groove, and an airflow collision groove wall that extends frontward in the vehicle body longitudinal direction from a top rear end of the guide groove wall.

By the above aspect, airflow into the wheel house from the rear of the wheel arises accompanying rotation of the wheel. The air of this airflow is guided by the inclined groove wall and penetrates into the width direction groove, and collides with the airflow collision groove wall. Due thereto, the pressure at the periphery of the width direction groove rises, and flowing-in of air into the wheel house is suppressed. Further, because the width direction groove is disposed at a portion of the wheel house that is positioned at the rear of the wheel (e.g., at the rear end and in a vicinity of the bottom end portion that opens downward of the wheel house), the flowing-in of air into the wheel house that accompanies rotation of the wheel is suppressed at the upstream end portion (the entrance), and discharging, from the side, of the air that has flowed into the wheel house is suppressed effectively.

Moreover, in the present aerodynamic structure for a vehicle, the open plane of the width direction groove can be made to substantially coincide with the position of the inner surface of the wheel house in a case in which the width direction groove is not provided. Thus, the space between the end portions of the wheel and the inclined groove wall does not become too large, and the effect of suppressing flowing-in of air into the wheel house due to the above-described rise in pressure is obtained reliably. On the other hand, because there is no fear of interference between the end portion of the inclined groove wall and the wheel, there are no limitations from the standpoint of aerodynamics for preventing this interference, and designing for obtaining a good effect of suppressing flowing-in of air is possible.

In this way, in the aerodynamic structure according to the above aspect, airflow within the wheel house can be adjusted effectively.

In the above aspect, a configuration may be provided in which both longitudinal direction ends of the width direction groove are closed.

By the above aspect, because the both longitudinal direction ends of the width direction groove are closed, it is easy to maintain the state of the pressure being high at the width direction groove, and flowing-in of air into the wheel house is suppressed effectively.

In the above aspect, a configuration may be provided in which the width direction groove is structured by a plurality of unit width direction grooves that are separated by ribs in a vehicle width direction and are disposed in series in the vehicle width direction.

By the above aspect, one row of width direction grooves that run along the vehicle width direction is formed by, for example, the width direction groove which is long in the vehicle width direction being partitioned by ribs provided within the width direction groove such that plural unit width direction grooves are formed, or by plural unit width direction grooves that are disposed in series in the vehicle width direction being independently formed concavely in a structural member of the wheel house. Therefore, it is easy to maintain the state of the pressure being high at the width direction grooves, and flowing-in of air into the wheel house is suppressed even more effectively.

In the above aspect, a configuration may be provided in which a plurality of the width direction grooves are provided along a peripheral direction of the wheel house.

By the above aspect, because the plural width direction grooves are provided in the peripheral direction of the wheel house, flowing-in of air into the wheel house accompanying rotation of the wheel is suppressed even more effectively. In particular, it is preferable that the plural width direction grooves be disposed so as to be continuous in the peripheral direction of the wheel house (such that the front/rear or the top/bottom edge portions of the width direction grooves that are adjacent in the peripheral direction of the wheel house coincide).

In the above aspect, a configuration may be provided in which a peripheral direction groove that opens toward an outer peripheral surface of the wheel is provided along a peripheral direction of the wheel house from a vehicle body longitudinal direction front side or a vehicle body vertical direction upper side portion with respect to the width direction groove at the inner surface side of the wheel house, to a front end side of the wheel house.

By the above aspect, the airflow, that flows-into the wheel house from the rear of the wheel and passes the placement region of the width direction groove as the wheel rotates, is guided to the peripheral direction groove, is led to the front end side of the wheel house, and is discharged from the wheel house. Therefore, discharging, from the side of the wheel house, of the air that has flowed into the wheel house is suppressed effectively.

In the above aspect, a configuration may be provided in which an opening edge at a vehicle body longitudinal direction rear side or a vehicle body vertical direction lower side at the peripheral direction groove is positioned at a vehicle body longitudinal direction front side or a vehicle body vertical direction upper side, with respect to an opening edge at a vehicle body longitudinal direction front side or a vehicle body vertical direction upper side at the width direction groove.

By the above aspect, because the width direction groove and the peripheral direction groove do not communicate, air is prevented from escaping (airflow is prevented from arising) from the width direction groove to the peripheral direction groove, and it is easy to maintain the state of the pressure of the width direction groove being high. Accordingly, discharging, from the side of the wheel house, of the air that has flowed into the wheel house is suppressed effectively at the peripheral direction groove, while the flowing-in of air from the rear of the wheel house that accompanies rotation of the wheel is suppressed effectively at the width direction groove.

Effects of the Invention

As described above, the aerodynamic structure for a vehicle relating to the present invention has the excellent effect of being able to effectively adjust airflow within a wheel house.

BRIEF DESCRIPTION OF THE DRAWINGS

FIG. 3 is a perspective view showing a fender liner with which the fixed aerodynamic stabilizer relating to the first exemplary embodiment of the present invention is formed integrally.

PREFERRED FORMS FOR EMBODYING THE INVENTION

A fixed aerodynamic stabilizer 10 serving as a wheel house structure for a vehicle relating to a first exemplary embodiment of the present invention will be described on the basis of FIG. 1 to FIG. 3. Note that arrow FR, arrow UP and arrow OUT that are written appropriately in the respective drawings respectively indicate the forward direction (direction of progression), the upward direction, and the vehicle width direction outer side of an automobile S to which the fixed aerodynamic stabilizer 10 is applied. Hereinafter, when upward, downward, frontward, rearward, and inner and outer sides in the vehicle width direction are indicated, they correspond to the directions of the aforementioned respective arrows. Further, in this exemplary embodiment, the fixed aerodynamic stabilizer 10 is applied respectively to left and right front wheels 15. However, because the left and right fixed aerodynamic stabilizers 10 are structured basically symmetrically, only the fixed aerodynamic stabilizer 10 at one side in the vehicle width direction (the left side with respect to the traveling direction) is illustrated in FIG. 1 and FIG. 2, and in the following explanation as well, description will be given of one of the fixed aerodynamic stabilizers 10.

Figure 1:
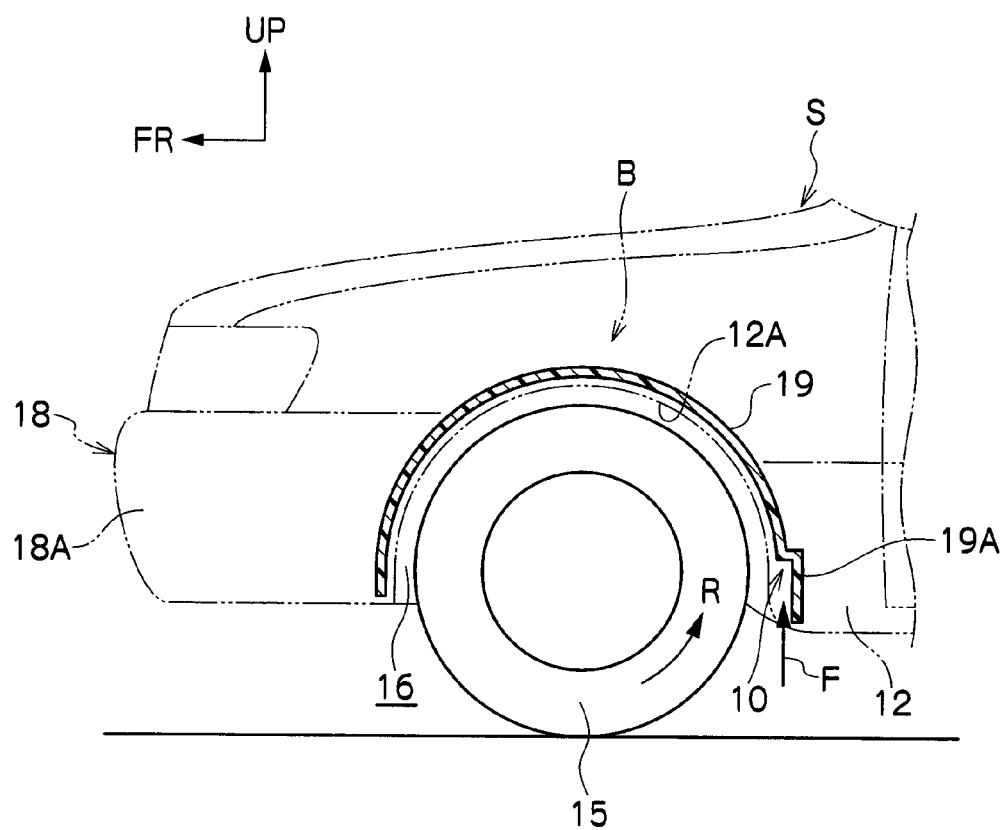
FIG. 1 is a side view showing a fixed aerodynamic stabilizer relating to a first exemplary embodiment of the present invention.

The fixed aerodynamic stabilizer 10 that is applied to the automobile S is shown in a schematic side view in FIG. 1. Further, the front portion of the automobile S, to which the fixed aerodynamic stabilizers 10 are respectively applied, is shown in a schematic plan view in FIG. 2. As shown in FIG. 1 and FIG. 2, the automobile S has a front fender panel 12 that structures a vehicle body B. A wheel arch 12A, that is formed in the shape of a semicircular arc that opens downward in side view, is formed in the front fender panel 12 for allowing turning of the front wheel 15. A fender apron 13 is joined to the inner side of the front fender panel 12. A wheel house inner 14 and an unillustrated suspension tower are formed at the fender apron 13.

The wheel house inner 14 forms a wheel house 16 which is disposed at the vehicle width direction outer side of the wheel house inner 14 such that the front wheel 15 can be turned in the wheel house 16. Further, as shown in FIG. 1, a bumper cover 18A structuring a front bumper 18 goes round to the lower side of the front side portion of the wheel arch 12A at the front fender panel 12, and the rear edge of this bumper cover 18A structures the front portion of the wheel arch 12A.

Figure 2:
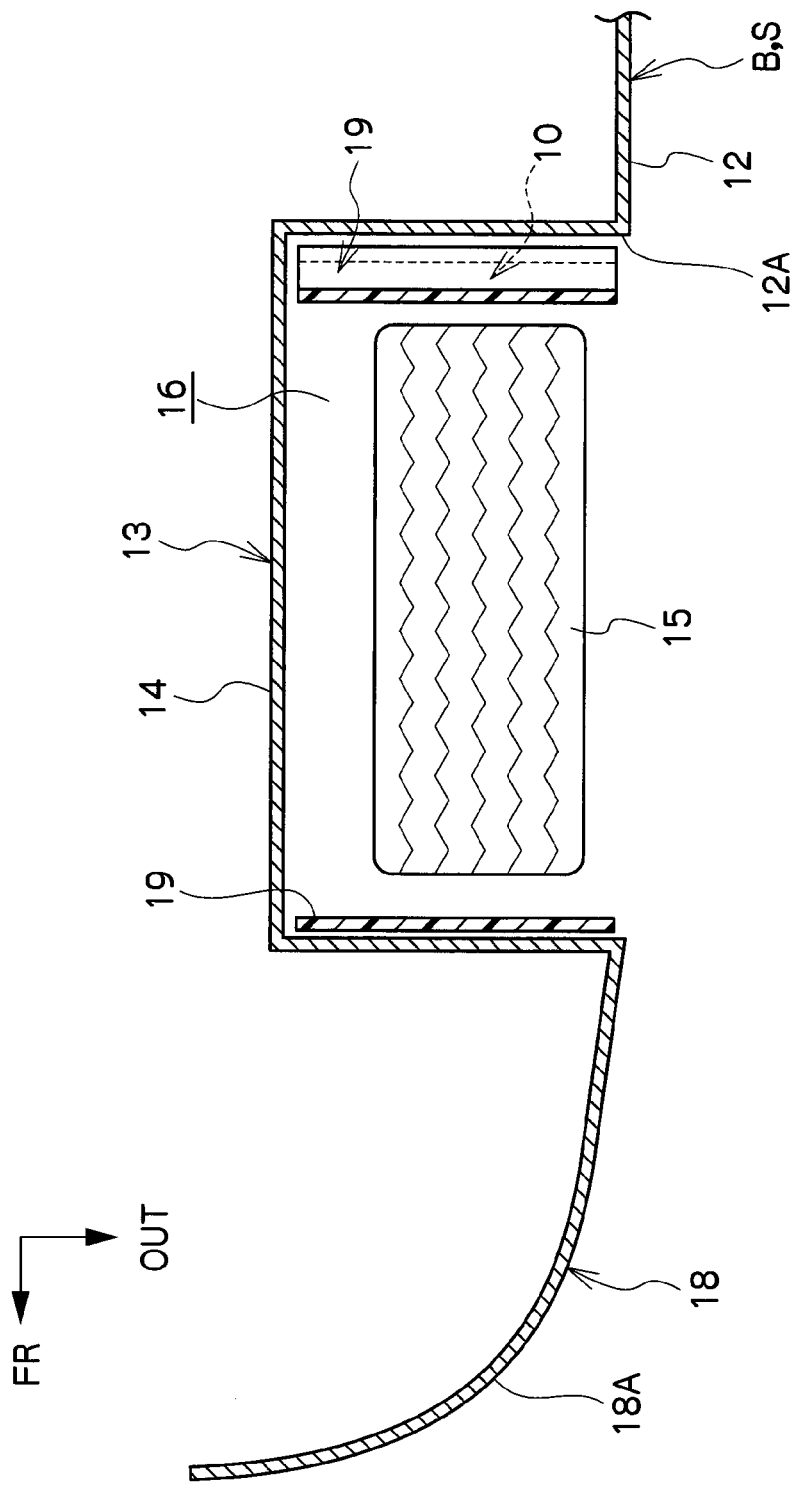
FIG. 2 is a plan sectional view showing a fixed aerodynamic stabilizer device relating to the first exemplary embodiment of the present invention.

As shown in FIG. 1 and FIG. 2, a fender liner 19, which is made of resin and is formed in a substantially semicircular arc shape corresponding the wheel arch 12A as seen in side view and is formed in a substantially rectangular shape that covers and hides the front wheel 15 as seen in plan view, is disposed at the inner side of the wheel house 16. Accordingly, the fender liner 19 is accommodated within the wheel house 16 so as to not be exposed from the wheel arch 12A as seen in side view, and covers the substantially upper half portion of the front wheel 15 from the front, above and the rear, and prevents mud, small stones, and the like from hitting the fender apron 13 (the wheel house inner 14) and the like.

Further, as shown in FIG. 1, the fixed aerodynamic stabilizer 10 is provided as a wind receiving surface that faces downward at the rear of the front wheel 15. In this exemplary embodiment, the fixed aerodynamic stabilizer 10 is formed integrally with the fender liner 19.

Specifically, as shown in FIG. 3 as well, the fixed aerodynamic stabilizer 10 is formed integrally with a portion of the fender liner 19 that is positioned rearward of the front wheel 15, as an airflow collision wall that is a step portion (crank portion) that looks out onto the interior of the wheel house 16 and faces downward in the vehicle body vertical direction, at a rear portion 19A of the fender liner 19 that extends substantially along the vertical direction at the rear of the front wheel 15. The fixed aerodynamic stabilizer 10 that faces downward at the rear of the front wheel 15 suppresses generation of airflow shown by arrow F within the wheel house 16, and suppresses generation of turbulent flow due to the air that enters in and exits from between the fender liner 19 and the front wheel 15 within the wheel house 16 (achieves the operation of adjusting the airflow).

Namely, the fixed aerodynamic stabilizer 10 is structured so as to block airflow F that arises due to rotation of the front wheel 15 in the direction of arrow R. Due thereto, the fixed aerodynamic stabilizer 10 suppresses flowing-in of the airflow F into the wheel house 16 that is caused by rotation of the front wheel 15, and suppresses generation of turbulent flow due to the air that enters in and exits from between the fender liner 19 and the front wheel 15 within the wheel house 16. Due to the airflow adjusting operation of the fixed aerodynamic stabilizer 10, the vertical load of the front wheel 15 is prevented from being weakened, and further, the airflow, that is directed toward a brake device (not illustrated) provided at the vehicle width direction inner side of the front wheel 15, is prevented from being obstructed by the turbulent flow.

At the automobile S to which the fixed aerodynamic stabilizer 10 of the above-described structure is applied, because the generation of turbulent flow within the wheel house 16 due to rotation of the front wheel 15 is suppressed by the fixed aerodynamic stabilizer 10, air resistance that accompanies high-speed traveling (air resistance due to turbulent flow) is lessened, and the vertical load of the front wheel 15 is prevented from decreasing. Accordingly, at the automobile S, an improvement in fuel consumption due to a reduction in air resistance, and an improvement in driving stability due to ensuring of the vertical load, are aimed for.

Figure 18:
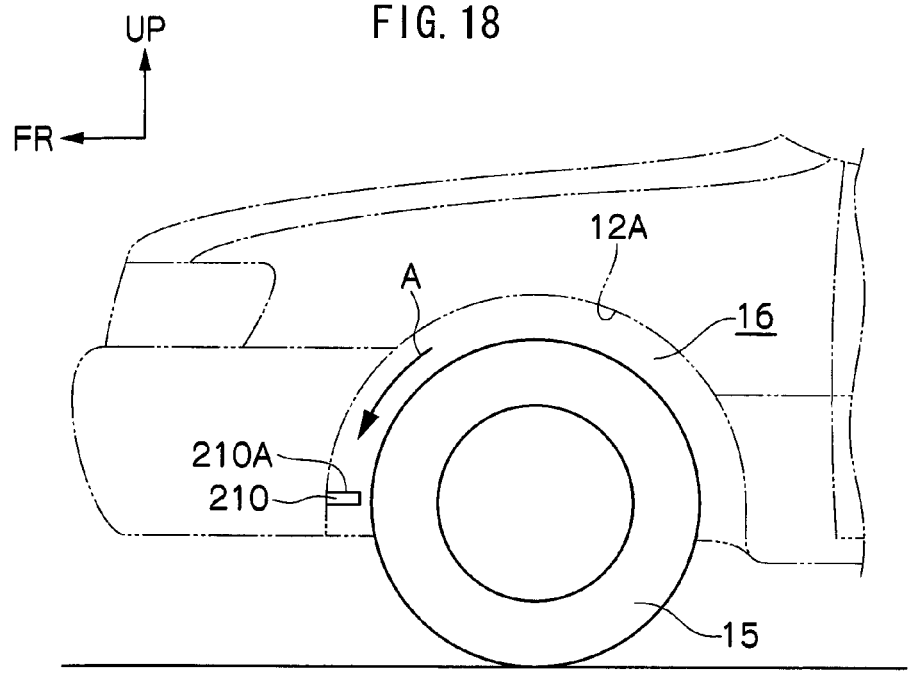
FIG. 18 is a side view of a fixed-type stabilizer relating to an example for comparison with the fourth exemplary embodiment of the present invention.

Further, because the fixed aerodynamic stabilizer 10 is formed integrally with the fender liner 19 as a downward-facing surface, the fixed aerodynamic stabilizer 10 does not form, within the wheel house 16, an upward-facing surface at which it is easy for snow and mud to stick and accumulate. For example, in a fixed-type stabilizer 210 that is shown in FIG. 18 and relates to a comparative example, the drawback that snow and mud stick to and grow on an upward-facing surface 210A, and this interferes with the front wheel 15 and leads to damage to the fixed-type stabilizer 210, may arise.

However, in the fixed aerodynamic stabilizer 10, because snow and mud do not stick as described above, the occurrence of such a drawback is prevented.

Other exemplary embodiments of the present invention will be described next. Note that parts/portions that are basically the same as the above-described first exemplary embodiment or preceding structures are denoted by the same reference numerals as in the above-described first exemplary embodiment or preceding structures, and description (illustration) thereof is omitted.

Second Exemplary Embodiment

Figure 4:
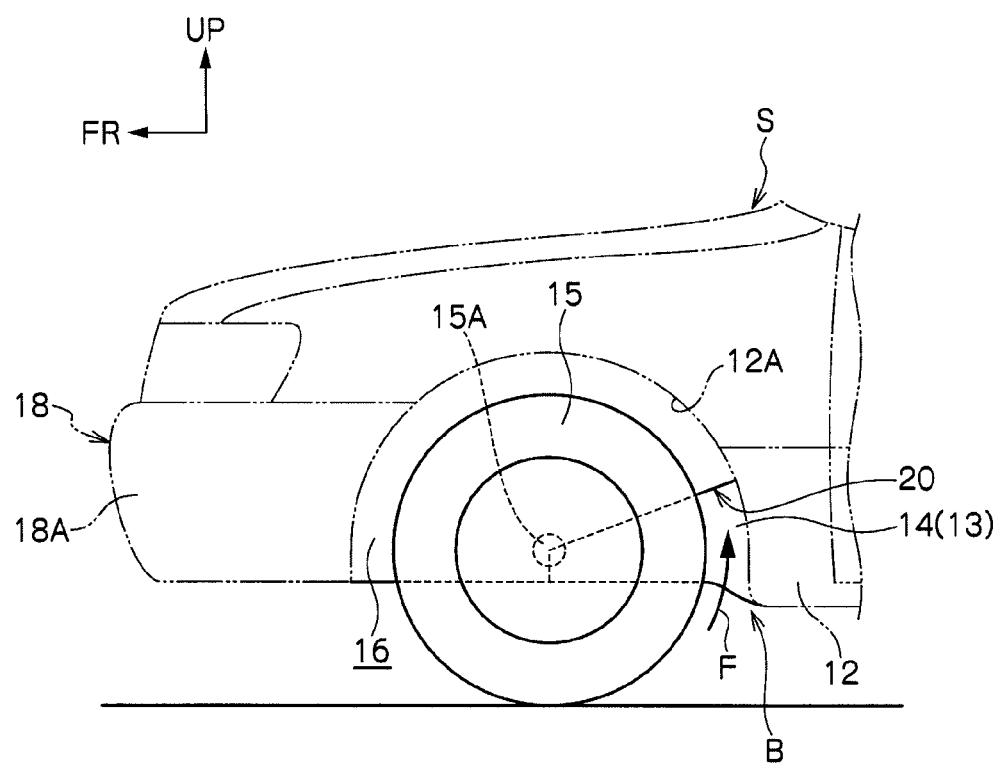
FIG. 4 is a side view showing a fixed aerodynamic stabilizer relating to a second exemplary embodiment of the present invention.

A fixed aerodynamic stabilizer 20, that serves as a wheel house structure for a vehicle and relates to a second exemplary embodiment of the present invention, is shown in a schematic side view in FIG. 4. As shown in this drawing, the fixed aerodynamic stabilizer 20 is provided as a wind receiving surface that faces downward at the vehicle width direction inner side at the rear of a rotational shaft 15A of the front wheel 15. In this exemplary embodiment, the fixed aerodynamic stabilizer 20 is formed integrally with a standing wall portion 14A at the wheel house inner 14 that faces the surface of the front wheel 15 which surface is directed toward the vehicle width direction inner side.

Figure 5A:
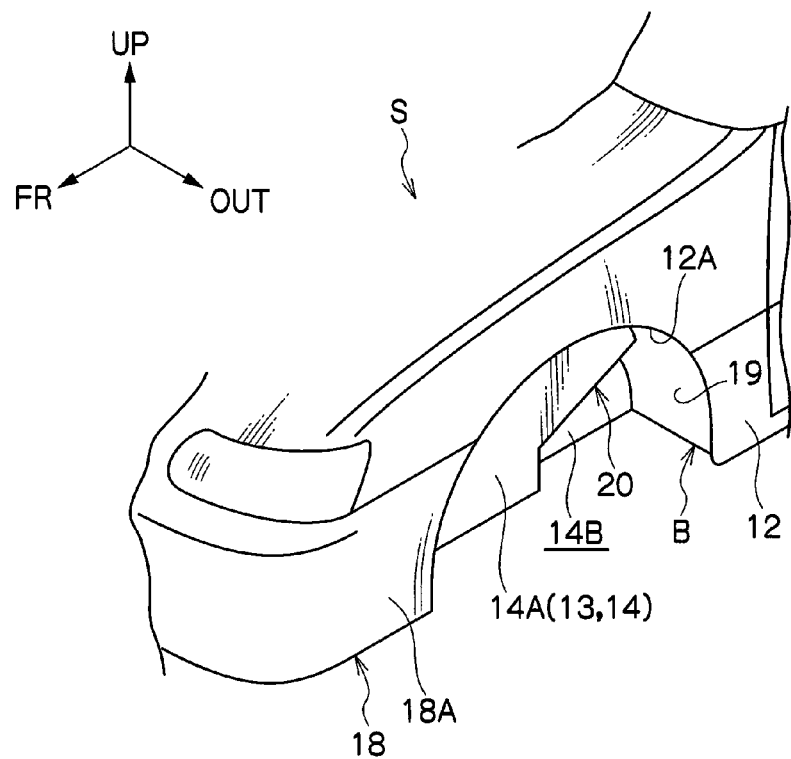
FIG. 5A is a drawing showing the fixed aerodynamic stabilizer relating to the second exemplary embodiment of the present invention, and is a perspective view seen with a front wheel removed.
Figure 5B:
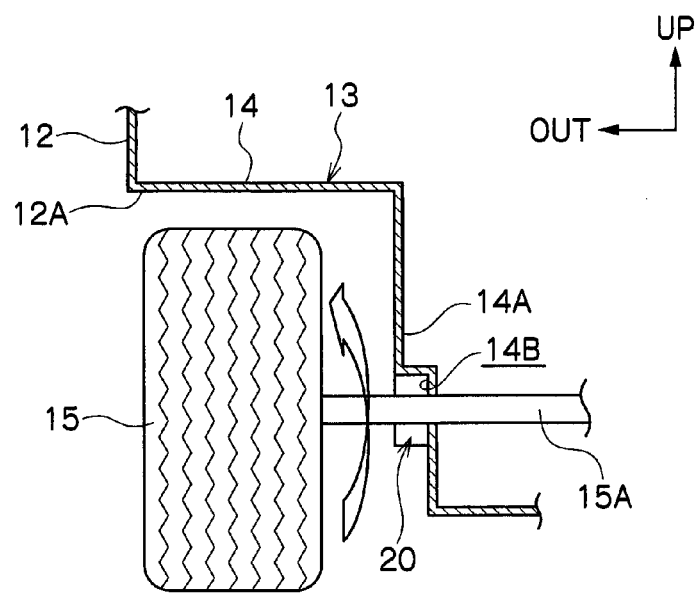
FIG. 5B is a rear view showing the fixed aerodynamic stabilizer relating to the second exemplary embodiment of the present invention.

Specifically, as shown in FIG. 5(A) and FIG. 5(B) as well, the fixed aerodynamic stabilizer 20 is formed integrally with the standing wall portion 14A as an airflow collision wall that is a downward-facing step portion (concave wall) that structures a concave portion 14B that is open and is concave downward and toward the vehicle width direction outer side at the substantially rear half portion of the standing wall portion 14A. Further, in this exemplary embodiment, the fixed aerodynamic stabilizer 20 is inclined, with respect to a horizontal plane, such that the rear end is at a higher level than the front end. This fixed aerodynamic stabilizer 20, that is a wind receiving surface that faces downward at the inner side of the rear side of the rotational shaft 15A of the front wheel 15, suppresses generation of the airflow F accompanying the rotation of the front wheel 15 within the wheel house 16 (the airflow F flowing-in into the wheel house 16), and suppresses generation of turbulent flow due to the air that enters in and exits from between the fender liner 19 and the front wheel 15 within the wheel house 16. Note that, instead of the structure of being formed integrally with the standing wall portion 14A of the fender apron 13, the fixed aerodynamic stabilizer 20 may, for example, be formed integrally with the standing wall portion 14A that is provided at an engine under cover. Further, the fixed aerodynamic stabilizer 20 may be provided such that the front end and the rear end are at the same height (horizontally), or the fixed aerodynamic stabilizer 20 may be provided at an incline with respect to a horizontal plane such that the front end is at a higher level than the rear end.

Figure 19:
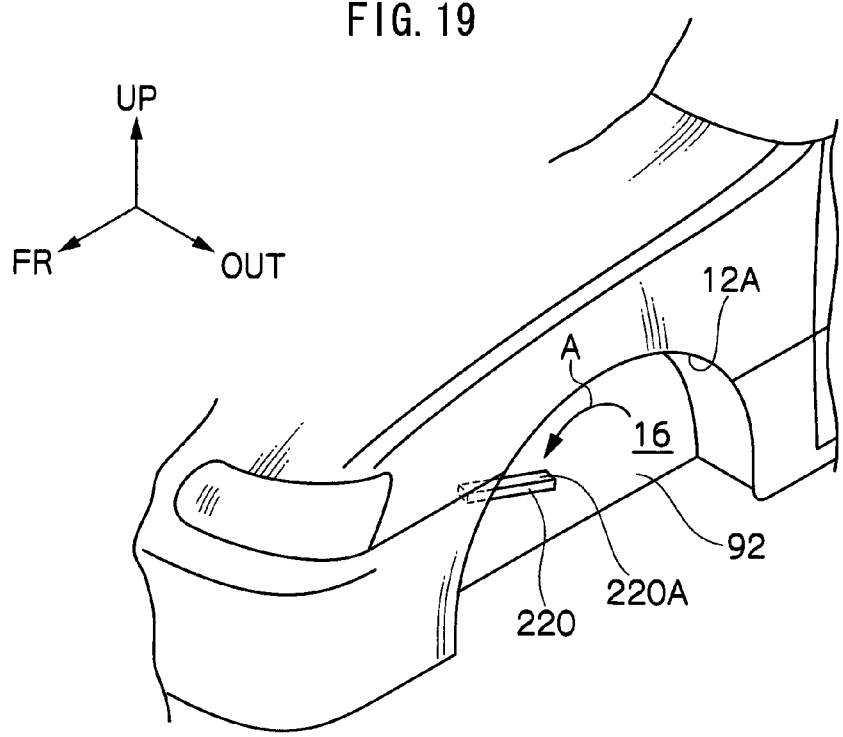
FIG. 19 is a perspective view of a fixed-type stabilizer relating to an example for comparison with the fifth exemplary embodiment of the present invention.

At the automobile S to which the fixed aerodynamic stabilizer 20 of the above-described structure is applied, because the generation of turbulent flow within the wheel house 16 due to rotation of the front wheel 15 is suppressed by the fixed aerodynamic stabilizer 20, an improvement in fuel consumption due to a reduction in air resistance, and an improvement in driving stability due to ensuring of the vertical load, are aimed for in the same way as in the first exemplary embodiment. Further, because the fixed aerodynamic stabilizer 20 is formed integrally with the standing wall portion 14A as a downward-facing surface, the fixed aerodynamic stabilizer 20 does not form, within the wheel house 16, an upward-facing surface at which it is easy for snow and mud to stick and accumulate. For example, in a fixed-type stabilizer 220 that is shown in FIG. 19 and relates to a comparative example, the drawback that snow and mud stick to and grow on an upward-facing surface 220A, and this interferes with the front wheel 15 and leads to damage to the fixed-type stabilizer 220, may arise. However, in the fixed aerodynamic stabilizer 20, because snow and mud do not stick as described above, the occurrence of such a drawback is prevented.

Third and Fourth Exemplary Embodiments

Figure 7:
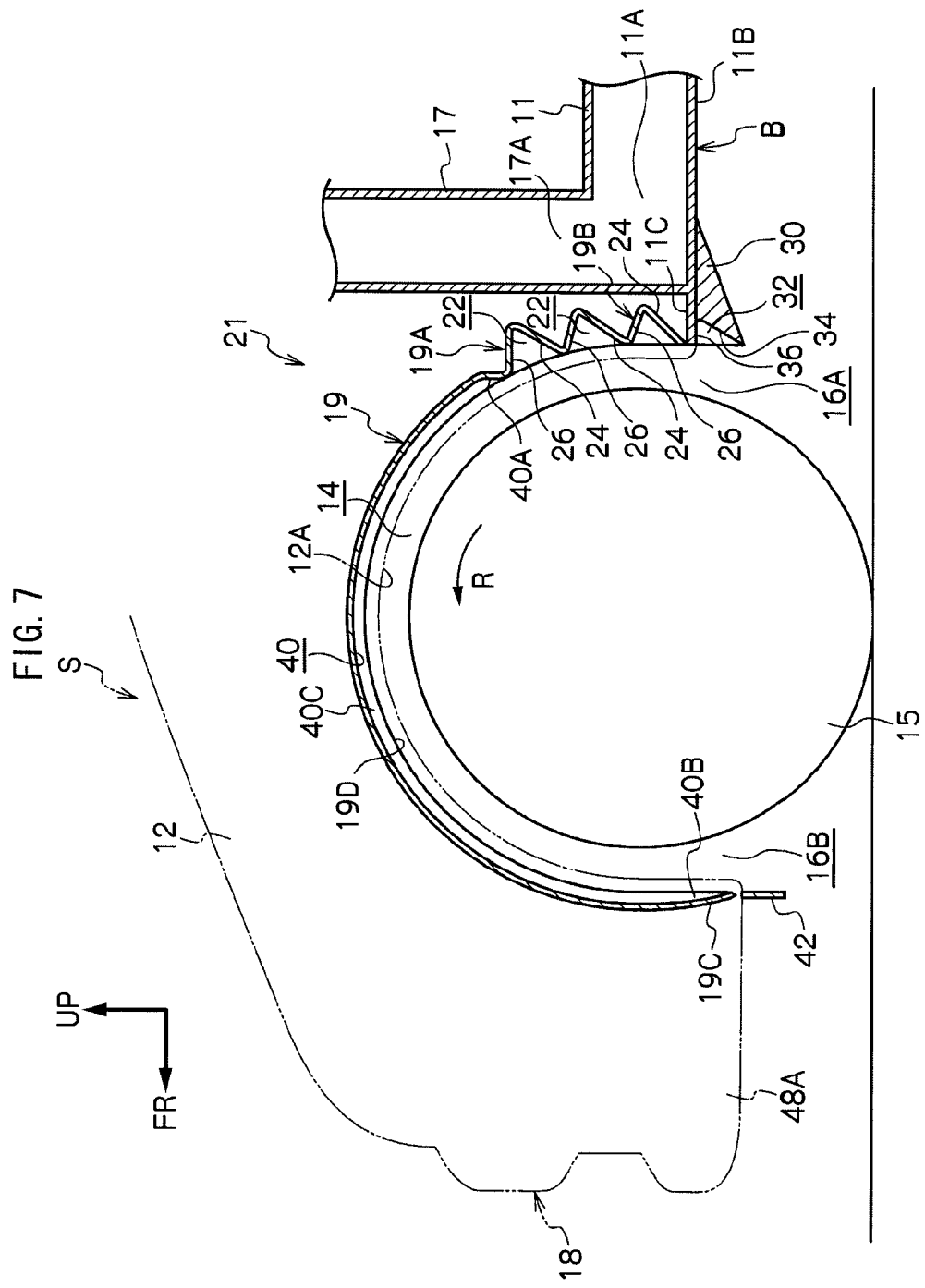
FIG. 7 is a side sectional view of the wheel house structure for a vehicle relating to the third exemplary embodiment of the present invention.

The front portion of the automobile S, to which a wheel house structure 21 for a vehicle is applied, is shown in a schematic side sectional view in FIG. 7. To further describe the vehicle body B of the automobile S on the basis of this drawing, the wheel house 16 is disposed directly in front of a front pillar 17 that forms the vehicle body vertical direction skeleton, and a lower end 17A of the front pillar 17 is joined to a front end 11A of a rocker 11 that forms the vehicle body longitudinal direction skeleton. An extended portion 11C extends from a bottom wall 11B of the rocker 11 to beneath a bottom rear edge portion 16A of the wheel house 16 (the wheel arch 12A). Further, a rear portion 19A of the fender liner 19 is disposed above the extended portion 11C at the rocker 11.

Figure 6:
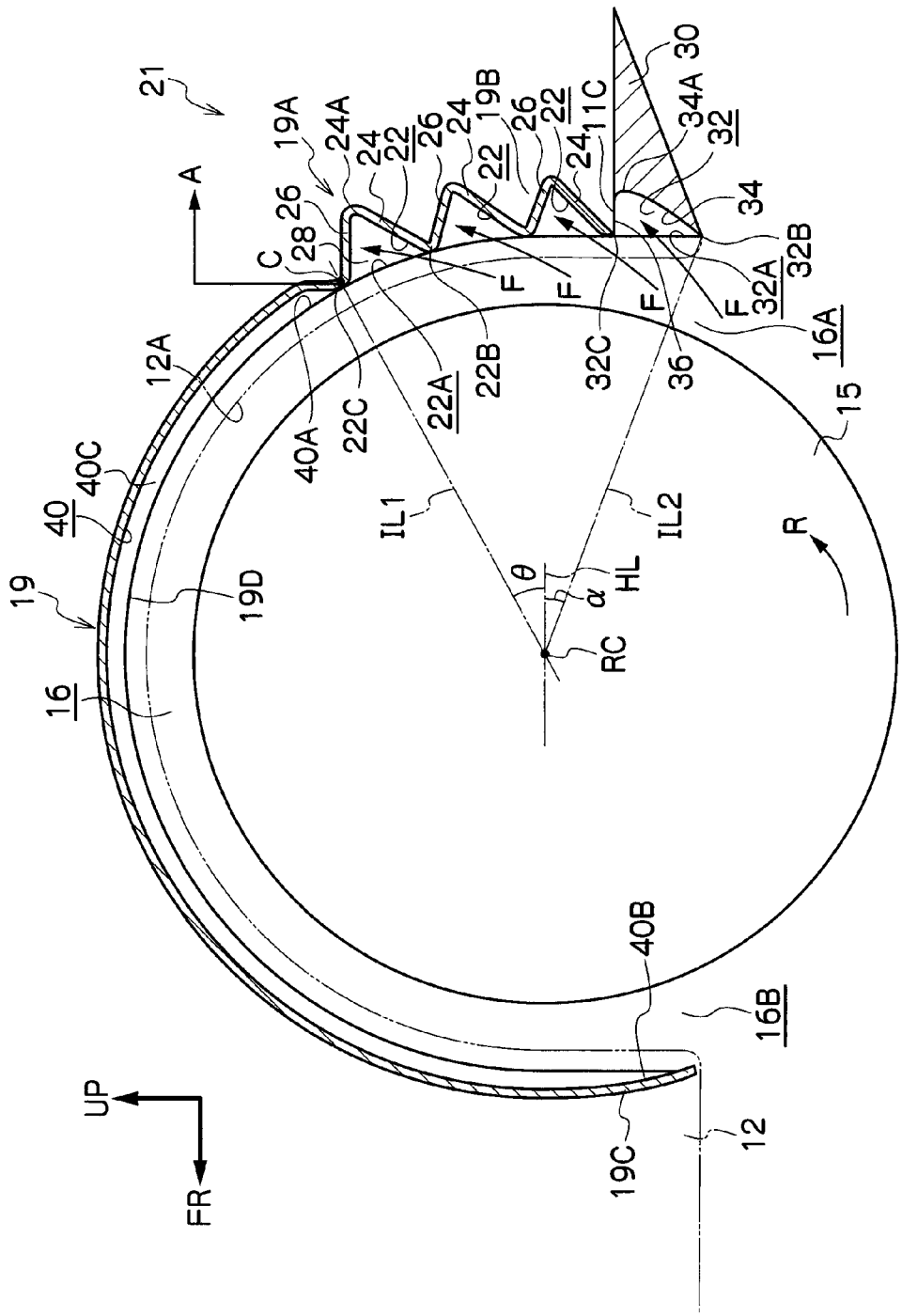
FIG. 6 is a side sectional view showing, in an enlarged manner, main portions of a wheel house structure for a vehicle relating to a third exemplary embodiment of the present invention.

Further, the wheel house structure 21 for a vehicle has stopper grooves 22 serving as width direction grooves that are provided at the fender liner 19. In this exemplary embodiment, the stopper grooves 22 are provided at a portion at the fender liner 19 that is positioned at the rear side of the front wheel 15 (a portion overlapping the front wheel 15 in the vehicle body vertical direction). More specifically, as shown in FIG. 6, the stopper grooves 22 are provided over, among the portion at the fender liner 19 that is rearward of a rotational axis RC of the front wheel 15, some of or all of a region A that is rearward and downward of a portion C that is intersected by an imaginary straight line IL1 that forms an angle $\theta$ ($-\alpha° < \theta < 90°$) with a horizontal line HL that passes through the rotational axis RC of the front wheel 15. The angle $\theta$ is, at the upper limit side of the setting range of the stopper grooves 22, preferably less than or equal to 50°, and more preferably less than or equal to 40°, and is made to be about 30° in this exemplary embodiment. Further, an angle $\alpha$ that prescribes the lower limit side of the setting range of the stopper grooves 22 is an angle that is formed by HL and an imaginary straight line IL2 that connects the bottom rear end portion of the wheel house 16 from the rotational axis RC of the front wheel 15. The bottom rear end portion of the wheel house 16 can be made to be, for example, the bottom rear end of the fender liner 19, and in this exemplary embodiment that is provided with a rear spats 30 that will be described later, is made to be the bottom end of the rear spats 30 (a bottom edge 32B of a stopper groove 32).

As shown in FIG. 6 and FIG. 7, the stopper grooves 22 are open toward the front wheel 15 side and form substantially triangular shapes as seen in side view whose widths along the peripheral direction of the fender liner 19 (the wheel house 16) are a maximum at opening portions 22A. More specifically, as shown in FIG. 6, the stopper groove 22 is structured to have a guide groove wall 24 serving as an inclined groove wall that extends rearward and upward from a bottom edge 22B of the opening portion 22A, and a stopper groove wall 26 serving as an airflow collision groove wall that extends toward a top edge 22C of the opening portion 22A from an upper rear end 24A of the guide groove wall 24.

At the stopper groove wall 26, the length of the side surface (the length of the side of the triangle) is small as compared with the guide groove wall 24. Due thereto, as shown in FIG.

6, the guide groove wall 24 extends in a direction substantially along the airflow F (the airflow substantially along the tangent direction of the front wheel 15) that arises accompanying the rotation of the front wheel 15 (rotation in the direction of arrow R that is the direction of causing the automobile S to advance forward), and guides the airflow F to within the stopper groove 22. On the other hand, the stopper groove wall 26 extends so as to face the airflow F, and the airflow F that flows-into the stopper groove 22 collides with the stopper groove wall 26.

Figure 8:
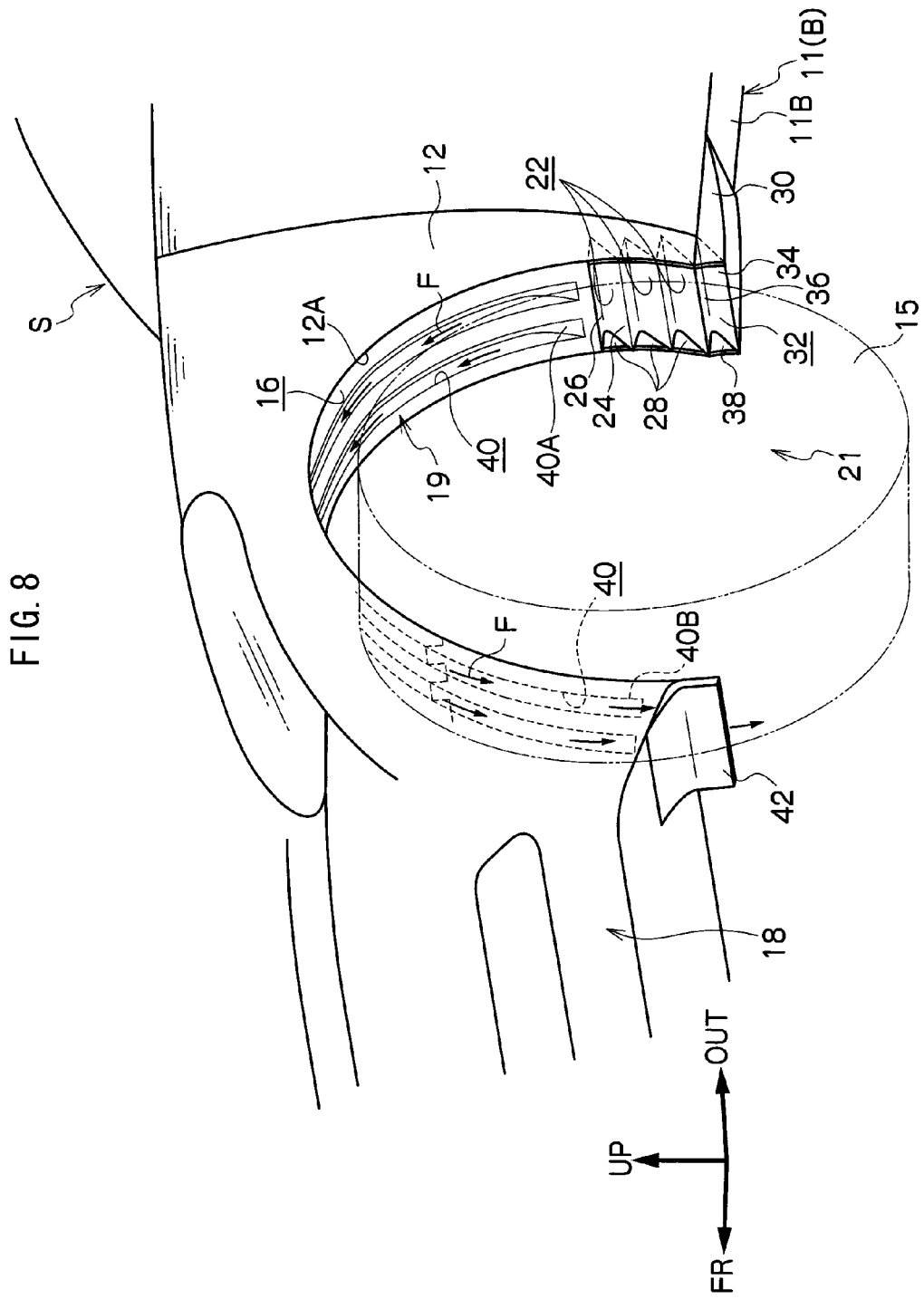
FIG. 8 is a perspective view of the wheel house structure for a vehicle relating to the third exemplary embodiment of the present invention.

Further, as shown in FIG. 8 as well, the stopper groove 22 is long in the vehicle width direction, and both ends thereof in this lengthwise direction are closed by side walls 28. Namely, the stopper grooves 22 are structured so as to be covered by the side walls 28 and so as to be difficult to be seen in side view (refer to FIG. 8 and FIG. 10). In this exemplary embodiment, the stopper grooves 22 are formed over substantially the entire width of the fender liner 19.

Due to the above, the wheel house structure 21 for a vehicle is structured such that a portion of the airflow F is blocked by the stopper grooves 22 and the pressure within the stopper grooves 22 rises, and accompanying this, the pressure between the opening portions 22A of the stopper grooves 22 and the front wheel 15 rises. Due to this rise in pressure, at the wheel house structure 21 for a vehicle, flowing-in of the airflow F into the wheel house 16 is suppressed.

Further, as shown in FIGS. 6 to 3, the plural (3 in this exemplary embodiment) stopper grooves 22 are provided at the fender liner 19 in parallel in the peripheral direction of the fender liner 19. In this exemplary embodiment, at the stopper grooves 22 that are adjacent in the peripheral direction of the fender liner 19, the bottom edges 22B, the top edges 22C of the opening portions 22A substantially coincide. Namely, the plural stopper grooves 22 are formed so as to form projections and indentations (wave shapes) that are triangular as seen in sectional view, continuously in the peripheral direction of the fender liner 19. Among the plural stopper grooves 22, the stopper groove 22 that is positioned the furthest downward and rearward is positioned at a lower rear end portion 19B of the fender liner 19. This stopper groove 22 is positioned directly above the extended portion 11C of the rocker 11.

Moreover, as shown in FIG. 6 and FIG. 7, the wheel house structure 21 for a vehicle is provided with the rear spats 30 that is disposed at the rear of the wheel house 16. The rear spats 30 is fixed to the bottom wall 11B of the rocker 11, and the stopper groove 32 is formed between the rear spats 30 and the extended portion 11C of the rocker 11. The stopper groove 32 is basically structured similarly to the stopper grooves 22. Specifically, the stopper groove 32 is structured to have a guide surface 34 that extends rearward and upward from the bottom edge 32B of an opening portion 32A that opens toward the front wheel 15, and a stopper surface 36 that extends toward a top edge 32C of the opening portion 32A from an upper rear end 34A of the guide surface 34. The respective functions of the guide surface 34, the stopper surface 36 are the same as the corresponding functions of the guide groove wall 24, the stopper groove wall 26.

In this exemplary embodiment, the guide surface 34 is formed at the stopper groove 32, and the stopper surface 36 is made to be the bottom surface of the extended portion 11C of the rocker 11. Namely, due to the rear spats 30 being fixed to the rocker 11 and the rear end portion of the wheel house 16 (the lower limit of the setting range of the stopper groove 32) extending downward, the structure in which the extended portion 11C of the rocker 11, which is a vehicle body structural member, is made to be the stopper surface 36 is realized. Due thereto, at the wheel house structure 21 for a vehicle, the stopper groove 32 is disposed so as to be continuous with beneath the stopper groove 22 which is positioned the furthest rearward and downward.

Further, as shown in FIG. 8 as well, the length of the stopper groove 32 in the vehicle width direction is a length equal to the stopper grooves 22, and the end portions of the stopper groove 32 in the longitudinal direction that coincide with end portions of the stopper grooves 22 in the vehicle width direction are closed by side walls 38. Namely, similarly to the stopper grooves 22, the stopper groove 32 is structured so as to be covered by the side walls 38 and so as to be difficult to see in side view (refer to FIG. 8 and FIG. 10).

Further, as shown in FIG. 6 to FIG. 8, the wheel house structure 21 for a vehicle is provided with guide grooves 40 serving as peripheral direction grooves that are provided at the fender liner 19 so as to open toward the front wheel 15 side. The sides of the guide grooves 40 that are further forward in the vehicle body longitudinal direction than (the stopper groove 22 positioned the furthest upward and forward among) the stopper grooves 22 are made to be proximal ends 40A, and the longitudinal direction of the guide grooves 40 is made to be along the peripheral direction of the fender liner 19, and the portions of the guide grooves 40 in a vicinity of a bottom front end portion 19C of the fender liner 19 are made to be final ends 40B. The guide grooves 40 do not communicate with the stopper grooves 22.

Figure 9:
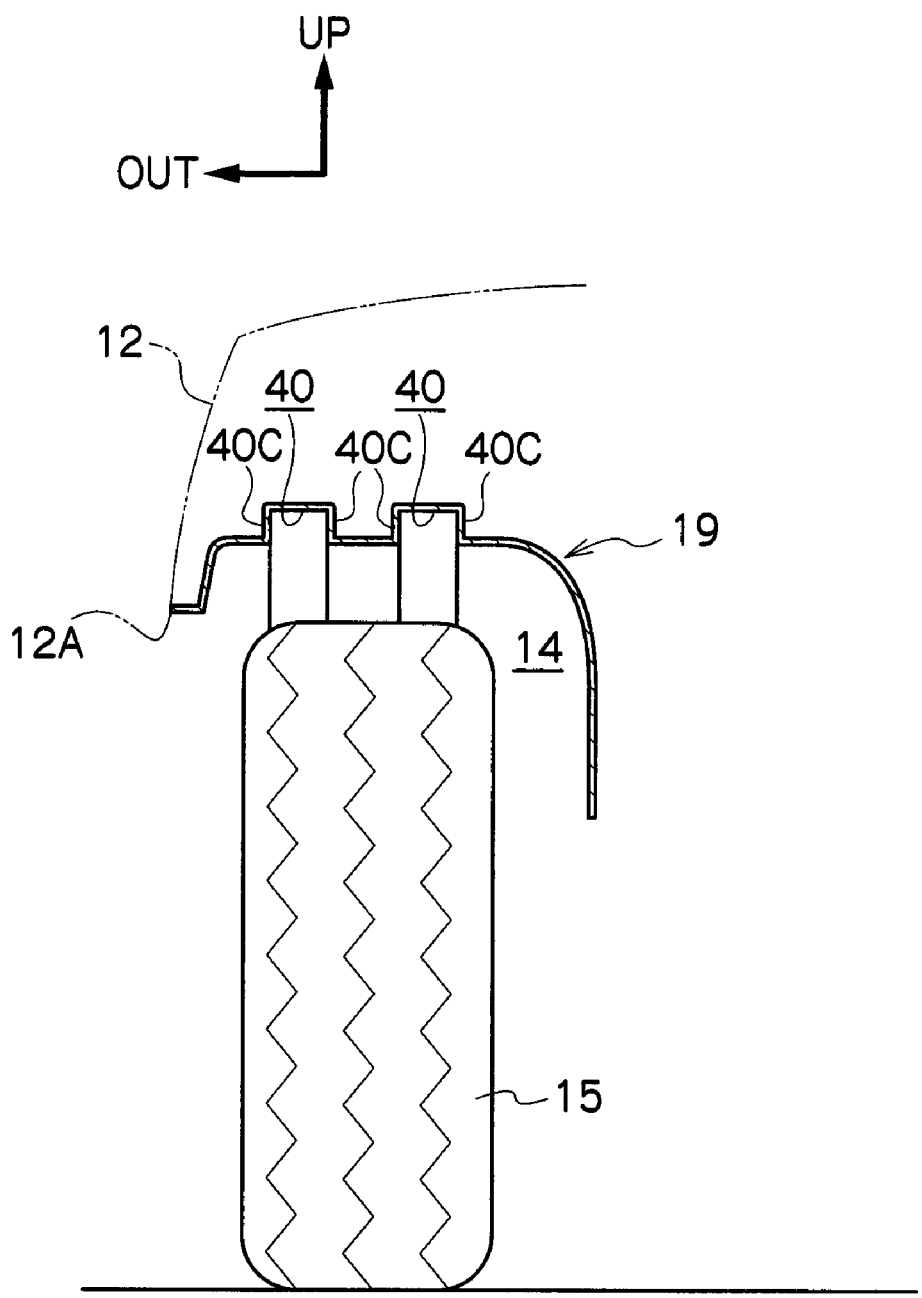
FIG. 9 is a rear sectional view of the wheel house structure for a vehicle relating to the third exemplary embodiment of the present invention.

The proximal ends 40A, the final ends 40B of the guide grooves 40 are respectively tapered and are continuous with a general surface 19D of the fender liner 19 (the open planes of the stopper grooves 22, the guide grooves 40), and the airflow along the peripheral direction of the stopper grooves 22 (the wheel house 16) flows-in and flows-out smoothly into and from the guide grooves 40. As shown in FIG. 9, in this exemplary embodiment, the plural (2) guide grooves 40 that are parallel in the vehicle width direction are provided. These guide grooves 40 are structured so as to guide the airflow, that is directed from the rear toward the front along the inner periphery of the fender liner 19, such that the airflow is made to flow-in from the proximal ends 40A and is discharged from the final ends 40B. In other words, a pair of groove walls 40C that oppose one another in the vehicle width direction at each guide groove 40 are structured so as to prevent airflow that is directed in the vehicle width direction from arising. Note that an example in which two of the guide grooves 40 are provided is shown in FIG. 8, but one of the guide grooves 40 only may be provided, or three or more of the guide grooves 40 may be provided.

Further, as shown in FIG. 6 to FIG. 8, the wheel house structure 21 for a vehicle is provided with a plate-shaped front spats 42 that extends downward from a bottom front edge portion 16B of the wheel house 16. The front spats 42 is structured so as to prevent travel wind, that accompanies traveling of the automobile S, from flowing-in into the wheel house 16.

Figure 10A:
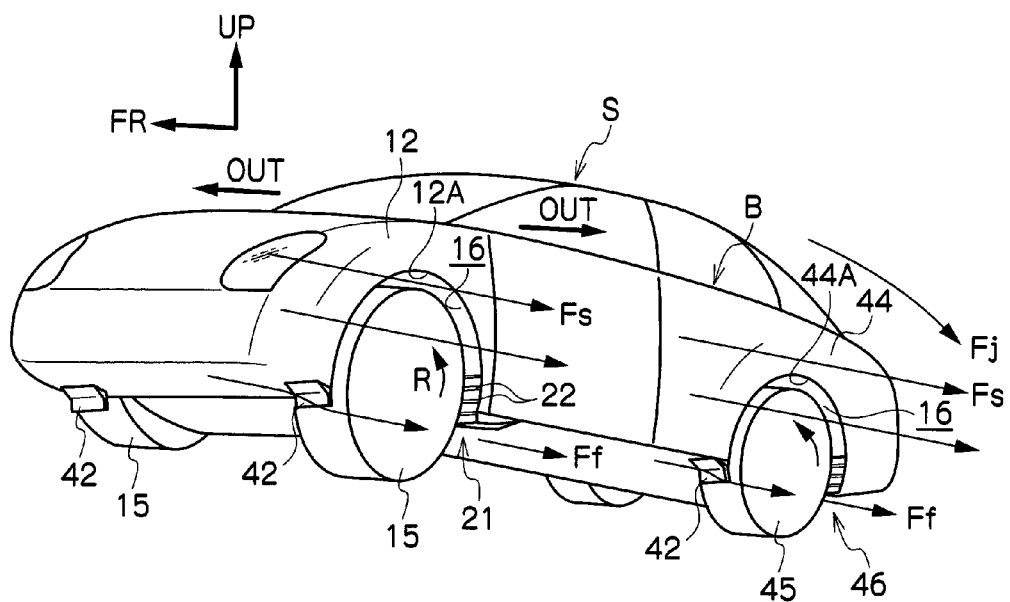
FIG. 10A is a perspective view of an automobile to which wheel house structures for a vehicle relating to the third and a fourth exemplary embodiments of the present invention are applied.
Figure 11:
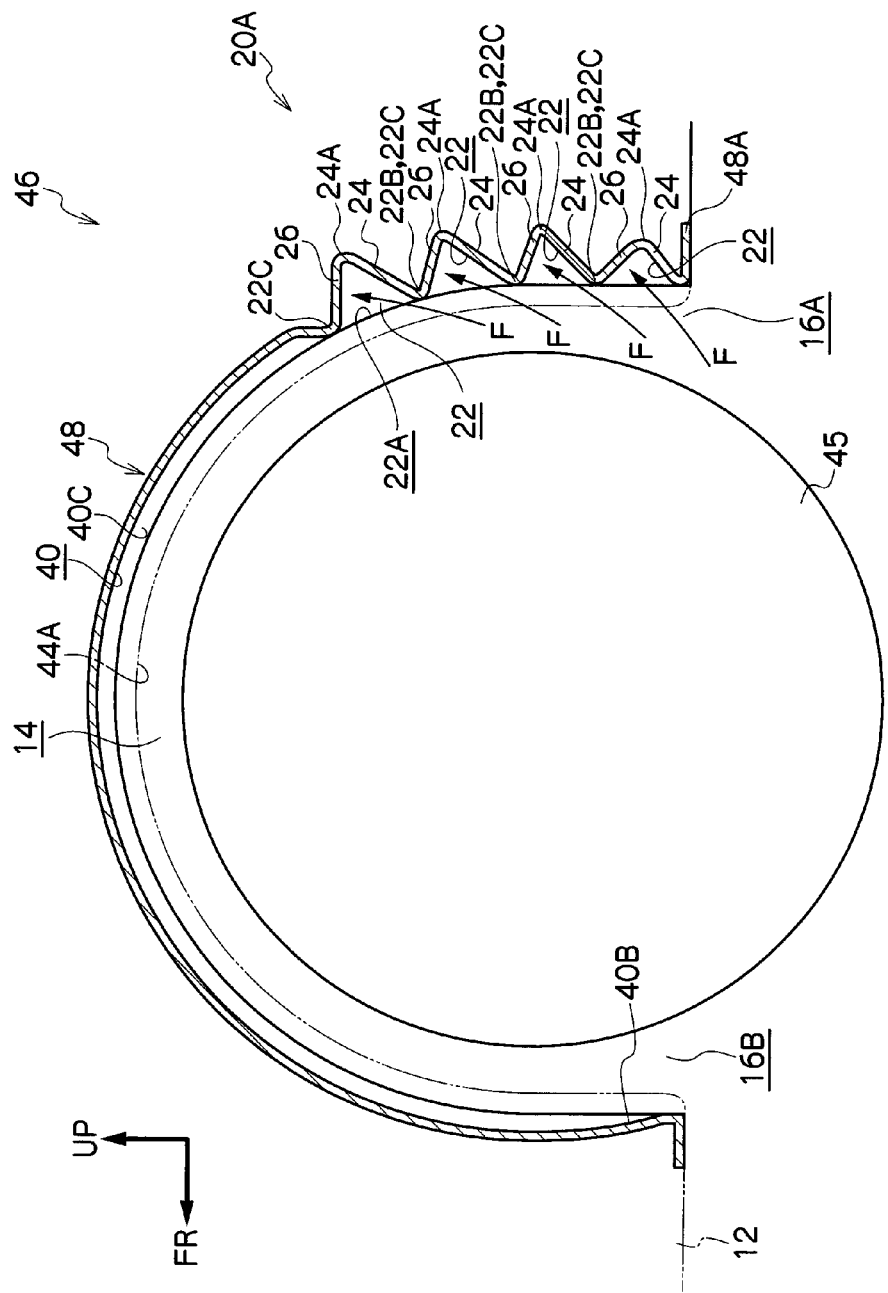
FIG. 11 is a side sectional view showing, in an enlarged manner, main portions of the wheel house structure for a vehicle relating to the fourth exemplary embodiment of the present invention.

Moreover, as shown in FIG. 10(A), at the automobile S relating to this exemplary embodiment, the wheel house 16 is formed at the inner side of a wheel arch 44A of a rear fender panel 44, and the automobile S relating to this exemplary embodiment is provided with a wheel house structure 46 for a vehicle that is for a rear wheel 45 disposed within this wheel house 16. To further explain the portions at the wheel house structure 46 for a vehicle relating to a fourth exemplary embodiment of the present invention that differ from the wheel house structure 21 for a vehicle, as shown in FIG. 11, the wheel house structure 46 for a vehicle is structured so as to not be provided with the rear spats 30, the stopper groove 32 (the guide surface 34, the stopper surface 36, the side walls 38), and is provided with a fender liner 48 at which four of the stopper grooves 22 are formed. Note that a bottom rear end portion 48A of the fender liner 48 extends in a substantially perpendicular direction and is further away from the front rear wheel 45 than the other portions, and the guide groove wall 24 is formed to be shorter than the stopper groove wall 26. The other structures of the fender liner 48 are the same as the corresponding structures of the fender liner 19, and accordingly, the other structures of the wheel house structure 46 for a vehicle are the same as the corresponding structures of the wheel house structure 21 for a vehicle.

Next, operation of the third and fourth exemplary embodiments will be described. Note that, at the wheel house structure 21 for a vehicle and the wheel house structure 46 for a vehicle, the function of the stopper groove 32 is merely replaced by the one stopper groove 22, and the wheel house structure 21 for a vehicle and the wheel house structure 46 for a vehicle exhibit basically similar operational effects. Therefore, hereinafter, mainly operation of the wheel house structure 21 for a vehicle will be described.

At the automobile S to which the wheel house structure 21 for a vehicle of the above-described structure is applied, when the front wheel 15 rotates in the direction of arrow R accompanying the traveling of the automobile S, the airflow F, that starts to be dragged in by this rotation of the front wheel 15 and flows-in substantially upward into the wheel house 16 from the rear of the front wheel 15, is generated. A portion of this airflow F is guided by the guide surface 34, the guide groove walls 24, and flows-into the stopper groove 32, the stopper grooves 22, and collides with the stopper surface 36, the stopper groove walls 26. Therefore, a portion of the airflow F is blocked, the pressure within the stopper groove 32, the stopper grooves 22 rises, and the range of this rise in pressure extends to the space between the stopper groove 32 and the stopper grooves 22, and the front wheel 15. Due thereto, at the wheel house structure 21 for a vehicle, flow-in resistance of air into the wheel house 16 from the rear of the front wheel 15 increases, and the flowing-in of air into the wheel house 16 is suppressed.

Further, another portion of the airflow F passes the setting range of the stopper groove 32, the stopper grooves 22 and flows-in into the wheel house 16. At least a portion of the airflow F attempts to flow at the outer peripheral side due to centrifugal force and flows-into the guide grooves 40, and, as is shown by using arrows appropriately in FIG. 8, is guided by the guide grooves 40 and discharged from the final ends 40B.

In this way, in the wheel house structures 21, 46 for a vehicle relating to the third, fourth exemplary embodiments, because the stopper grooves 22 (and the stopper groove 32) suppress flowing-in of air into the wheel house 16, the airflow F that attempts to flow into the wheel house 16 from beneath the floor of the automobile S is weak, and disturbance of the airflow at the periphery of the wheel house 16 is prevented (is adjusted). Specifically, as shown in FIG. 10(A), airflow Ff beneath the floor is prevented from being disturbed, and the smooth airflow Ff is obtained beneath the floor.

Further, the amount of air that flows into the wheel house 16 decreases, and the amount of air that is discharged from the side of the wheel house 16 also decreases. In particular, because the stopper grooves 22 (and the stopper groove 32) are disposed at the bottom rear edge portion 16A which is the furthest upstream portion where the airflow F flows into the wheel house 16, in other words, the amount of air that is discharged from the side of the wheel house 16 is decreased further. For these reasons, at the automobile S, airflow Fs along the side surface is prevented from being disturbed, and the smooth airflow Fs is obtained at the side surface.

Due to the above, at the automobile S to which the wheel house structures 21, 46 for a vehicle are applied, a reduction in air resistance (the CD value), an improvement in the driving stability, a reduction in wind noise, a reduction in splashing (water being scattered-up from the road surface by the front wheel 15, the rear wheel 45), and the like can be aimed for due to the operation of the stopper grooves 22 (and the stopper groove 32).

Further, at the wheel house structure 21, 46 for a vehicle, because the guide grooves 40 are provided forward of the stopper grooves 22, the airflows at the inner side and at the side of the wheel house 16 are adjusted. Specifically, because the airflow F within the wheel house 16 flows along (parallel to) the direction of rotation of the front wheel 15, the rear wheel 45 by the guide grooves 40, disturbance of the airflow within the wheel house 16 (the application of air force to the front wheel 15, the rear wheel 45) is prevented. Further, because discharging of air that has gone via the side of the wheel house 16, i.e., the wheel arch 12A, is suppressed, the smooth airflow Fs is obtained at the automobile S.

Therefore, at the automobile S to which the wheel structures 21, 46 for a vehicle are applied, a reduction in air resistance, an improvement in the driving stability, a reduction in wind noise, a reduction in splashing, and the like can be aimed for also due to the operation of the guide grooves 40. Accordingly, at the automobile S in which the wheel house structures 21 for a vehicle are provided so as to correspond to the front wheels 15 and the wheel house structures 46 for a vehicle are provided so as to correspond to the rear wheels 45, as shown in FIG. 10(A), at both the front portion and the rear portion of the vehicle body B, the smooth airflows Ff, Fs that do not have blowing-out that causes disturbance at the side surfaces and beneath the floor are obtained, and these flows merge smoothly at the rear of the vehicle body B (refer to arrow Fj).

Figure 10B:
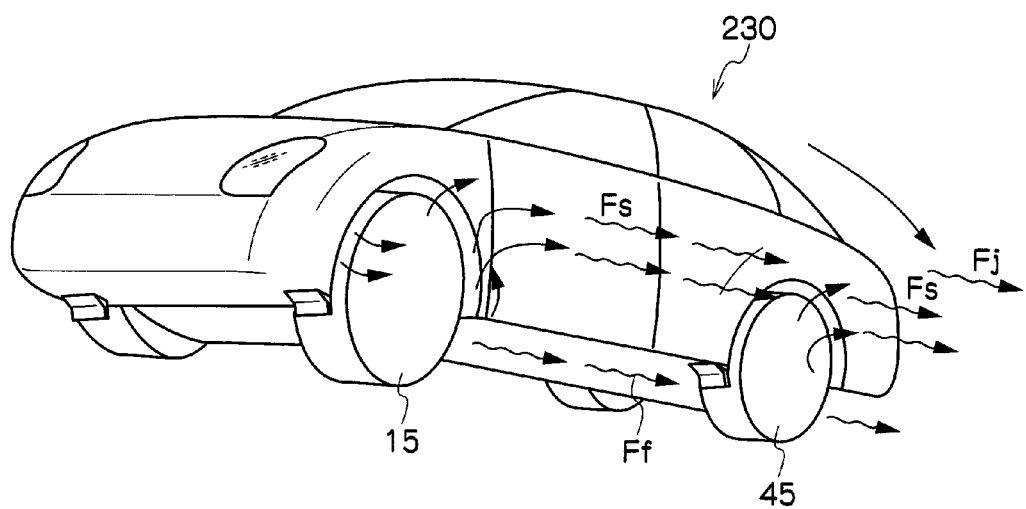
FIG. 10B is a perspective view of an automobile to which a wheel house structure for a vehicle relating to an example for comparison with the third and fourth exemplary embodiments of the present invention is applied.

To supplement explanation by comparison with a comparative example shown in FIG. 10(B), at a comparative example 230 that is not provided with the wheel house structures 21, 46 for a vehicle, the airflows F are generated within the wheel houses 16 accompanying the rotation of the front wheels 15, the rear wheels 45, and this flowing-in causes disturbance of the airflow Ff beneath the floor directly behind the front wheels 15, the rear wheels 45 (the portions where the airflows into the wheel houses 16 are generated). Further, the airflows F that flow-in into the wheel houses 16 go via the wheel arches 12A and are discharged out to the sides of the vehicle body, and cause disturbance of the airflows Fs. For these reasons, disturbance is caused as well in Fj that merges at the rear of the vehicle body B.

In contrast, at the automobile S to which the wheel house structures 21, 46 for a vehicle are applied, as described above, the flowing-in of air in the wheel houses 16 from the rear of the front wheels 15, the rear wheels 45 is suppressed by the stopper grooves 22, the stopper grooves 32, and the airflows that flow-in into the wheel houses 16 are adjusted at the guide grooves 40. Therefore, as described above, a reduction in air resistance, an improvement in the driving stability, a reduction in wind noise, a reduction in splashing, and the like can realized.

In particular, at the wheel house structures 21, 46 for a vehicle, because the plural stopper grooves 22 (and the stopper groove 32) are provided continuously, the flowing-in of air to the wheel houses 16 from the rear of the front wheels 15, the rear wheels 45 can be suppressed even more effectively. Further, because the guide grooves 40 do not communicate with the stopper grooves 22, air does not flow from the stopper grooves 22 to the guide grooves 40 and the pressure of the stopper grooves 22 does not decrease, and the effect of suppressing the flowing-in of the airflows F into the wheel houses 16 and the effect of adjusting the airflows F that have flowed into the wheel houses 16 can both be established.

Further, at the wheel house structures 21, 46 for a vehicle, because the stopper grooves 22 and the guide grooves 40 are positioned so as to be concave with respect to the general surface 19D of the fender liner 19, interference with the front wheel 15, the rear wheel 45 is not a problem. Accordingly, the wheel house structures 21, 46 for a vehicle are not bound by limitations in order to prevent interference with the front wheel 15, the rear wheel 45, and the stopper grooves 22, the guide grooves 40 can be designed on the basis of performances required from the standpoint of aerodynamics. On the other hand, because the open planes of the opening portions 22A of the stopper grooves 22 (the stopper groove 32) substantially coincide with the bottom rear end portion 19B of the fender liner 19, the spaces between the stopper grooves 22 and the front wheel 15, the rear wheel 45 do not become too large, and a rise in pressure can be generated therebetween, and the operation of suppressing flowing-in of the airflow F into the wheel house 16 can be brought about reliably.

Fifth Exemplary Embodiment

Figure 12:
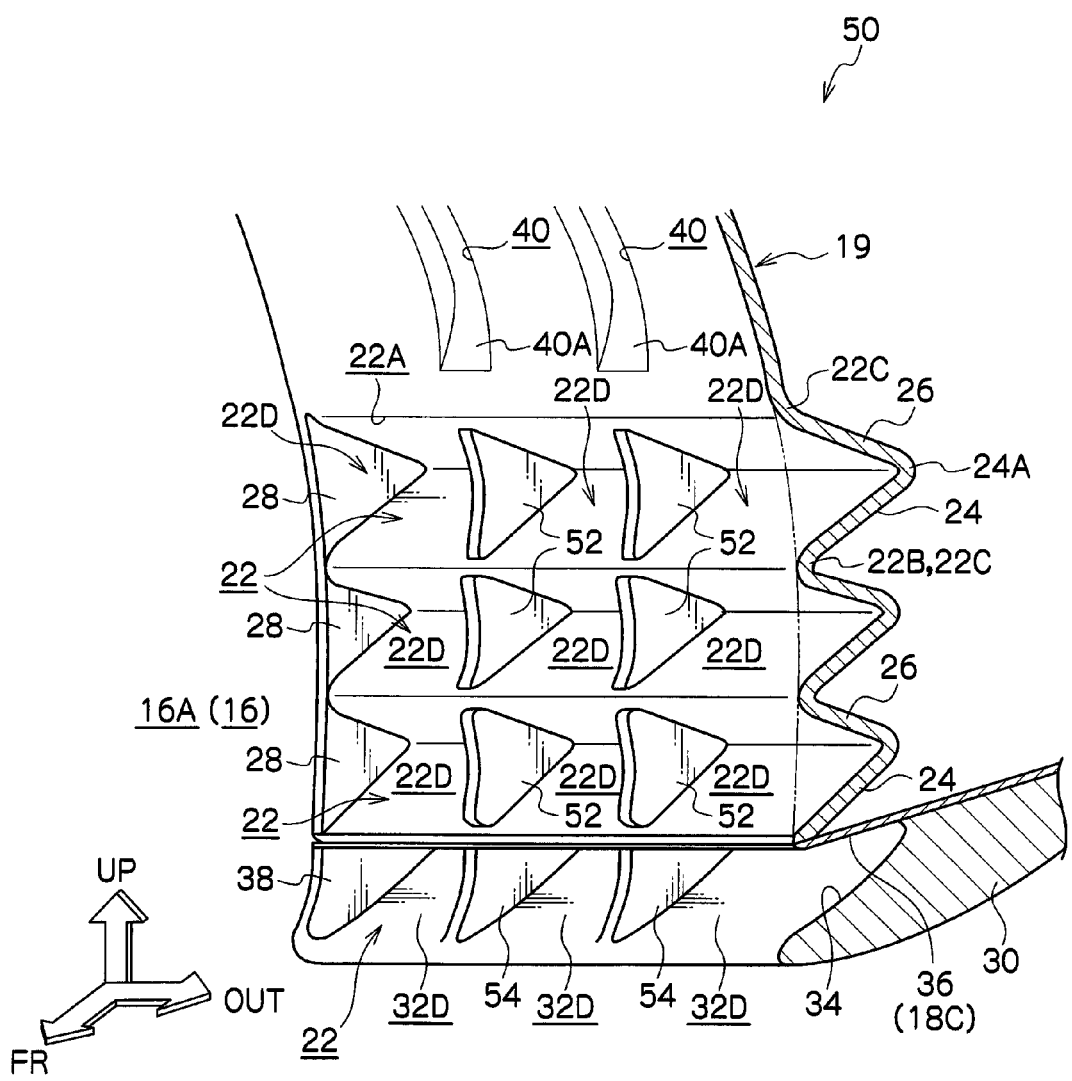
FIG. 12 is a perspective view showing, in an enlarged manner, main portions of a wheel house structure for a vehicle relating to a fifth exemplary embodiment of the present invention.

Main portions of a wheel house structure 50 for a vehicle relating to a fifth exemplary embodiment of the present invention are shown in a perspective view in FIG. 12. As shown in this drawing, the wheel house structure 50 for a vehicle differs from the wheel house structure 21 for a vehicle relating to the third exemplary embodiment with respect to the point that the respective stopper grooves 22, the stopper groove 32 are partitioned in the vehicle width direction by ribs 52, 54.

In this exemplary embodiment, the plural (2) ribs 52 are disposed at each stopper groove 22, and each stopper groove 22 is partitioned into 3 unit stopper grooves 22D. Further, the plural (2) ribs 54 are disposed at the stopper groove 32, and each stopper groove 32 is partitioned into 3 unit stopper grooves 32D. The ribs 52 are formed integrally with the fender liner 19, and the ribs 54 are formed integrally with the rear spats 30. The other structures of the wheel house structure 50 for a vehicle include portions that are not illustrated, and are the same as corresponding structures of the wheel house structure 21 for a vehicle.

Accordingly, at the wheel house structure 50 for a vehicle relating to the fifth exemplary embodiment, basically, similar effects can be obtained by operation that is similar to the wheel house structure 21 for a vehicle. Further, at the wheel house structure 50 for a vehicle, because the stopper grooves 22, the stopper groove 32 are partitioned in the vehicle width direction by the ribs 52, the ribs 54, movement, in the vehicle width direction, of the air at the interior is restricted, and it is easy for the rise in pressure, that is generated due to the airflow F colliding with the guide groove walls 24, the guide surface 34, to be maintained. Due thereto, the flowing-in of the airflow F to the wheel house 16 from the rear of the front wheel 15 can be suppressed even more effectively.

Note that, although description thereof is omitted, similar operational effects can be obtained even if the ribs 52 are provided at the fender liner 48 structuring the wheel house structure 46 for a vehicle.

Sixth Exemplary Embodiment

Figure 13:
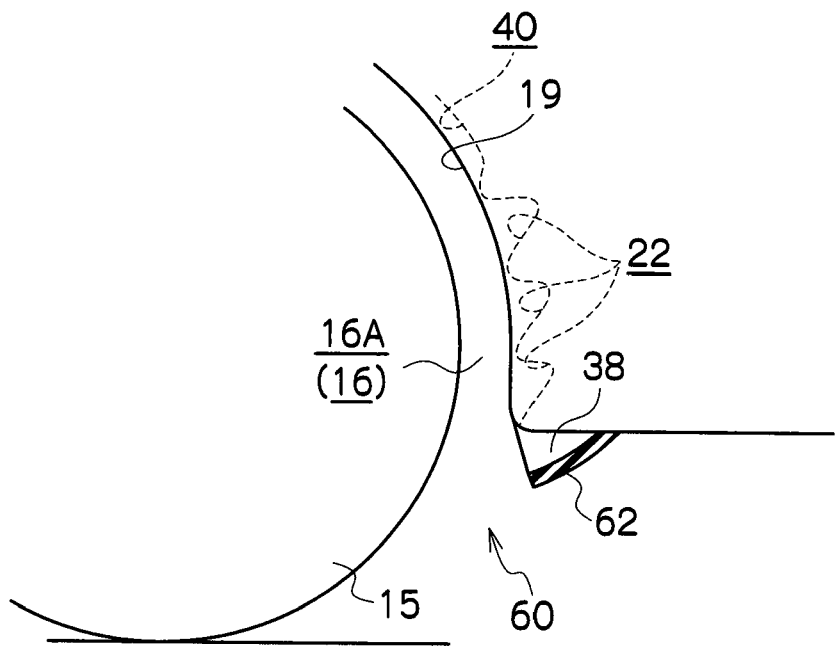
FIG. 13 is a side view showing main portions of a wheel house structure for a vehicle relating to a sixth exemplary embodiment of the present invention.

Main portions of a wheel house structure 60 for a vehicle relating to a sixth exemplary embodiment are shown in a side view in FIG. 13. As shown in this drawing, the wheel house structure 60 for a vehicle differs from the wheel house structure 21 for a vehicle relating to the third exemplary embodiment with respect to the point that the wheel house structure 60 for a vehicle is provided with a rear spats 62 instead of the rear spats 30.

The rear spats 62 is formed in the shape of a plate of a material such as, for example, rubber or the like, and is structured so as to be flexible. The rear spats 62 has the guide surface 34 and, together with the extended portion 11C (the rocker 11), forms the stopper groove 32, and achieves a similar function as the rear spats 30. The side walls 38 may be provided at the rear spats 62, but it is preferable to provide the side walls 38 at the fender liner 19, the rocker 11, an unillustrated fender garnish, or the like. The other structures of the wheel house structure 60 for a vehicle include unillustrated portions, and are the same as corresponding structures of the wheel house structure 21 for a vehicle.

Accordingly, the wheel house structure 60 for a vehicle relating to the sixth exemplary embodiment basically can obtain similar effects due to operation that is similar to the wheel house structure 21 for a vehicle. Further, at the wheel house structure 60 for a vehicle, because the stopper groove 32 is structured at the rear spats 62 that is flexible, the stopper groove 32 can be formed by a simple structure as compared with a case using the rear spats 30 that has a three-dimensional shape. Moreover, it is difficult for the rear spats 62 to be damaged due to, for example, stones that fly-up or the like.

Seventh Exemplary Embodiment

Figure 14:
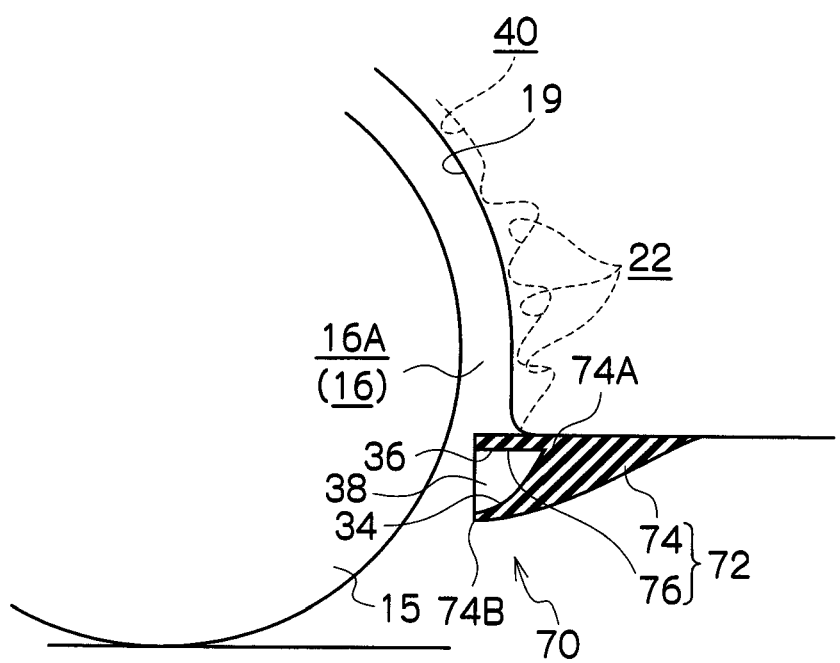
FIG. 14 is a side view showing main portions of a wheel house structure for a vehicle relating to a seventh exemplary embodiment of the present invention.

Main portions of a wheel house structure 70 for a vehicle relating to a seventh exemplary embodiment of the present invention are shown in a side view in FIG. 14. As shown in this drawing, the wheel house structure 70 for a vehicle differs from the wheel house structure 21 for a vehicle relating to the third exemplary embodiment with respect to the point that the wheel house structure 70 for a vehicle is provided with a rear spats 72 that by itself forms the stopper groove 32, instead of the rear spats 30 that, together with the rocker 11, forms the stopper groove 32.

The rear spats 72 is structured such that an extending piece 76 having the stopper surface 36 extends toward the front wheel 15 side from a top front end 74A of a main body portion 74 that has the guide surface 34. The rear spats 72 is structured of a material such as, for example, rubber or the like, and a bottom front portion 74B of the main body portion 74 (the guide surface 34) and the extending piece 76 are structured so as to be flexible. Further, in this exemplary embodiment, the bottom front portion 74B of the main body portion 74 and the extending piece 76 project-out further toward the front wheel 15 side than the opening portions 22A of the stopper grooves 22 (the general surface 19D of the fender liner 19).

Further, the pair of side walls 38 are provided integrally and of the same material, so as to connect the extending piece 76 and side edge portions of the guide surface 34 at the main body portion 74. Accordingly, at the rear spats 72, the side walls 38 as well are flexible. The side walls 38 may be structured, for example, to be thin-walled as compared with the extending piece 76 and the like. The other structures of the wheel house structure 70 for a vehicle include unillustrated portions, and are the same as corresponding structures of the wheel house structure 21 for a vehicle.

Accordingly, the wheel house structure 70 for a vehicle relating to the seventh exemplary embodiment basically can obtain similar effects due to operation that is similar to the wheel house structure 21 for a vehicle. Further, at the wheel house structure 70 for a vehicle, because the bottom front portion 74B, the extending piece 76 and the side walls 38 of the main body portion 74 respectively are flexible, even if interference with the front wheel 15 arises, damage is prevented from arising at the main body portion 74, the extending piece 76. Therefore, a structure in which the bottom front portion 74B of the main body portion 74 and the extending piece 76, i.e., the stopper groove 32, are disposed adjacent to the front wheel 15 can be realized. Due thereto, in the wheel house structure 70 for a vehicle, flowing-in of the airflow F into the wheel house 16 can be suppressed even more effectively at the furthest upstream portion (the entrance portion) where the airflow F flows into the wheel house 16 at the rear of the front wheel 15. Moreover, it is difficult for the rear spats 72 to be damaged due to, for example, stones that fly-up or the like.

Eighth Exemplary Embodiment

Figure 15:
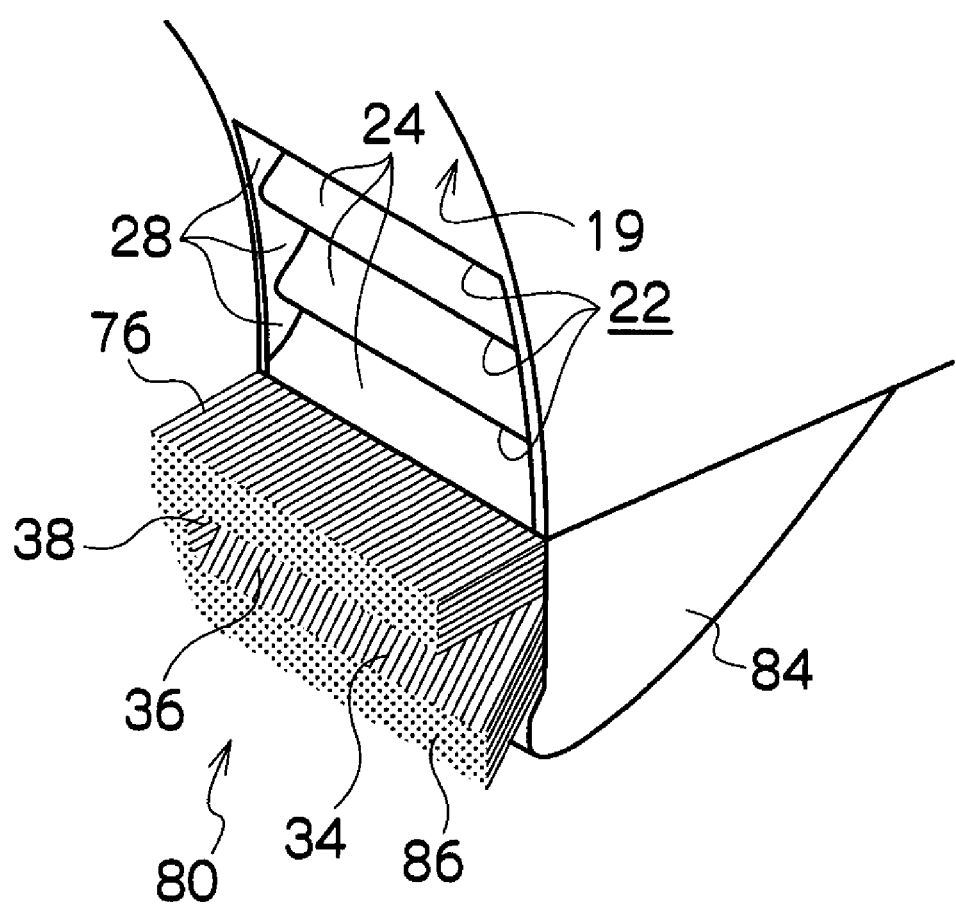
FIG. 15 is a perspective view showing main portions of a wheel house structure for a vehicle relating to the fifth exemplary embodiment of the present invention relating to an eighth exemplary embodiment of the present invention.

Main portions of a wheel house structure 80 for a vehicle relating to an eighth exemplary embodiment of the present invention are shown in a perspective view in FIG. 15. As shown in this drawing, the wheel house structure 80 for a vehicle differs from 70 relating to the eighth exemplary embodiment with respect to the point that the wheel house structure 80 for a vehicle is provided with a rear spats 82 that is structured from a large number of linear members, instead of the rear spats 72 that is structured by a single member made of rubber or the like.

The rear spats 82 is structured so as to be provided with a base member 84 that is fixed to the rocker 11, and a guide piece 86, the extending piece 76 and the side walls 38 that are respectively formed from a large number of brush materials (bristle materials) whose roots are embedded in the base member 84. The surface at the guide piece 86, which surface is directed frontward and upward, is the guide surface 34. The other structures of the wheel house structure 80 for a vehicle include unillustrated portions, and are the same as corresponding structures of the wheel house structure 70 for a vehicle.

Accordingly, the wheel house structure 80 for a vehicle relating to the eighth exemplary embodiment basically can obtain similar effects due to operation that is similar to the wheel house structure 70 for a vehicle. Further, at the wheel house structure 80 for a vehicle, because the guide piece 86 (the guide surface 34), the extending piece 76 and the side walls 38 respectively are formed in the form of a brush by a large number of brush materials, damage can effectively be prevented from arising even if interference with the front wheel 15 arises.

Ninth Exemplary Embodiment

Figure 16:
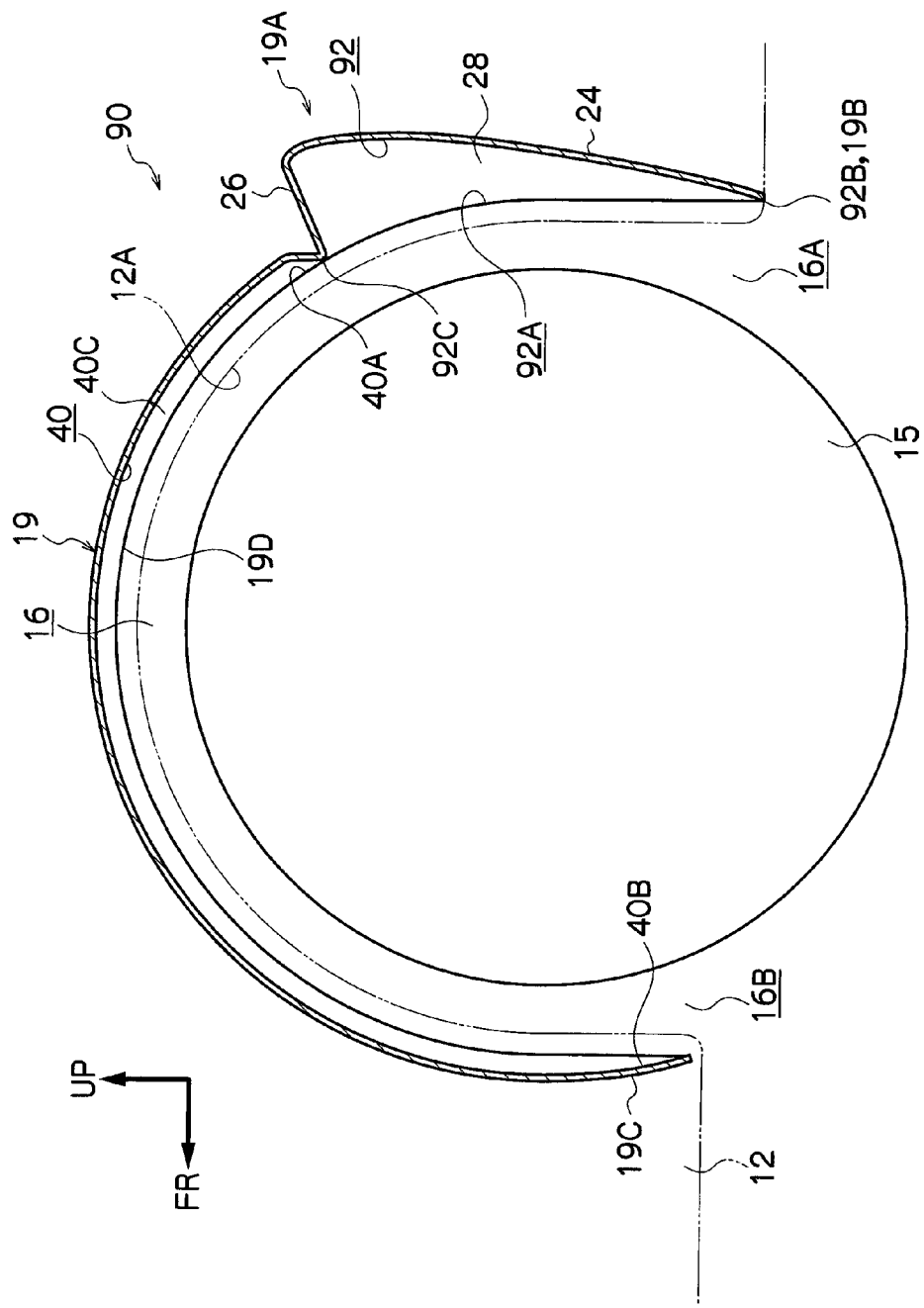
FIG. 16 is a side sectional view showing, in an enlarged manner, main portions of a wheel house structure for a vehicle relating to a ninth exemplary embodiment of the present invention.

Main portions of a wheel house structure 90 for a vehicle relating to a ninth exemplary embodiment of the present invention are shown in FIG. 16 in a side sectional view that corresponds to FIG. 6. As shown in this drawing, the wheel house structure 90 for a vehicle differs from the wheel house structure 21 for a vehicle relating to the third exemplary embodiment with respect to the point that a stopper groove 92 serving as a single width direction groove is formed at the fender liner 19 instead of the plural stopper grooves 22.

An opening portion 92A of the stopper groove 92 has a opening width in the peripheral direction that corresponds to the setting range of the plural stopper grooves 22 in the wheel house structure 21 for a vehicle. More specifically, a bottom edge 92B of the opening portion 92A of the stopper groove 92 substantially coincides with the bottom rear end portion 19B of the fender liner 19, and a top edge 92C is disposed adjacent to the proximal ends 40A of the guide grooves 40. This stopper groove 92 is formed over the entire width of the fender liner 19, and the both vehicle width direction ends are closed by the side walls 28. The other structures of the wheel house structure 90 for a vehicle include unillustrated portions, and are the same as corresponding structures of the wheel house structure 21 for a vehicle.

Accordingly, the wheel house structure 90 for a vehicle relating to the ninth exemplary embodiment basically can obtain similar effects due to operation that is similar to the wheel house structure 21 for a vehicle. Note that an example, that is provided with the large, single stopper groove 92 over the setting range of the plural stopper grooves 22, is illustrated in the ninth exemplary embodiment. However, the present invention is not limited to the same, and, for example, may be a structure that is provided with the single stopper groove 92 having a dimension of the same extent as the stopper groove 22, or a dimension between the stopper groove 22 and the stopper groove 92.

Tenth Exemplary Embodiment

Figure 17:
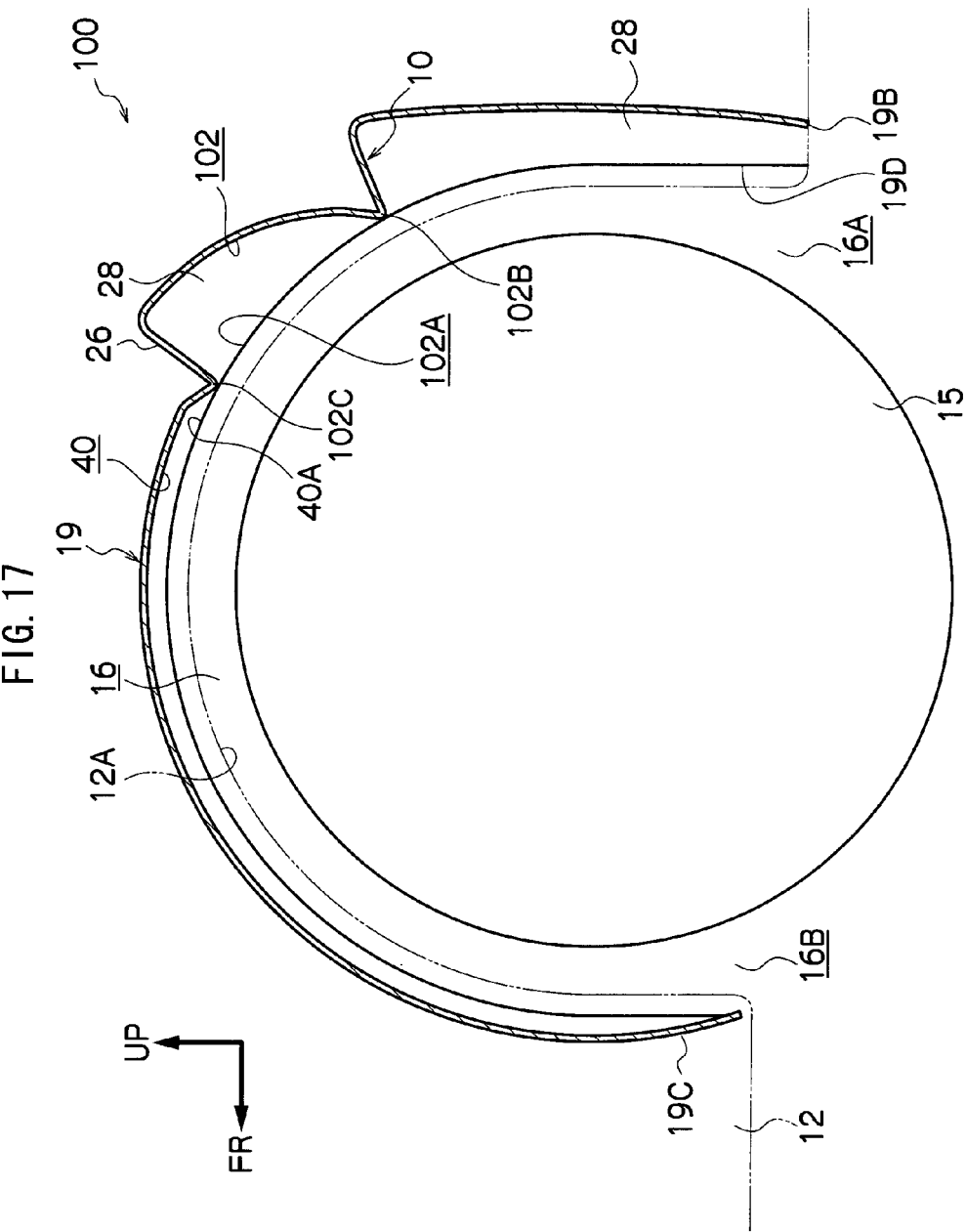
FIG. 17 is a side sectional view showing, in an enlarged manner, main portions of a wheel house structure for a vehicle relating to a tenth exemplary embodiment of the present invention.

Main portions of a wheel house structure 100 for a vehicle relating to a tenth exemplary embodiment of the present invention are shown in FIG. 17 in a side sectional view that corresponds to FIG. 6. As shown in this drawing, the wheel house structure 100 for a vehicle differs from the wheel house structure 21 for a vehicle relating to the third exemplary embodiment with respect to the point that the wheel house structure 100 for a vehicle is provided with both a stopper groove 102 that serves as a single width direction groove, and the fixed aerodynamic stabilizer 10 that serves as a step portion.

The stopper groove 102 is disposed so as to be continuous with the vehicle body vertical direction upper side of the fixed aerodynamic stabilizer 10 at the fender liner 19. Namely, a bottom edge 102B of an opening portion 102A of the stopper groove 102 substantially coincides with the end portion of the fixed aerodynamic stabilizer 10 at the front wheel 15 side. Further, an upper edge 102C of the opening portion 102A is disposed in a vicinity of the proximal ends 40A of the guide grooves 40.

The stopper groove 102 and the fixed aerodynamic stabilizer 10 are respectively formed over the entire width of the fender liner 19, and the both vehicle width direction ends thereof respectively are closed by the side walls 28. In other words, the fixed aerodynamic stabilizer 10 in this exemplary embodiment can be interpreted as a stopper groove (width direction groove) at which the position of the bottom edge 10B of the opening portion 10A is away from the front wheel 15 as compared with the general surface 19D of the fender liner 19. The other structures of the wheel house structure 100 for a vehicle include unillustrated portions, and are the same as corresponding structures of the wheel house structure 21 for a vehicle.

Accordingly, the wheel house structure 100 for a vehicle relating to the tenth exemplary embodiment basically can obtain similar effects due to operations that are similar to the fixed aerodynamic stabilizer 10 relating to the first exemplary embodiment and the wheel house structure 21 for a vehicle relating to the third exemplary embodiment. Note that an example in which the single stopper groove 102 and the fixed aerodynamic stabilizer 10 are combined is illustrated in the tenth exemplary embodiment, but the present invention is not limited to the same and, for example, may be a structure combining the stopper grooves 22 and the fixed aerodynamic stabilizer 10.

Note that, in each of the above-described third through eighth exemplary embodiments, an example in which the wheel house structure 46 for a vehicle for the rear wheel 45 is not provided with the rear spats 30, the rear spats 62, 72, 82 is illustrated. However, the present invention is not limited to the same, and, for example, may be a structure in which the wheel house structure 46 for a vehicle is provided with the rear spats 62, 72, 82. Further, it goes without saying that the fixed aerodynamic stabilizer 10, 20 or the wheel house structure 90, 100 for a vehicle may be applied to the rear wheel 45. This case is not limited to a structure in which the same fixed aerodynamic stabilizers 10 or the like, the wheel house structures 21 or the like for a vehicle are provided at all of the wheels. Various types of combinations, such as for example, the wheel house structures 21 for a vehicle are provided at the front wheel 15 sides and the fixed aerodynamic stabilizers 10 are provided at the rear wheel sides, are possible. Further, it goes without saying that it is possible to provide the fixed aerodynamic stabilizers 10 or the like, the wheel house structures 21 or the like for a vehicle at only the rear wheel sides.

Further, in each of the above-described third through ninth exemplary embodiments, an example in which the stopper grooves 22, 92 are disposed at the bottom rear edge portion 16A of the wheel house 16 is illustrated. However, the present invention is not limited to the same, and the stopper grooves 22 may be disposed at any portion at the vehicle body longitudinal direction rear side of the rotational axis RC of the front wheel 15.

Moreover, in each of the above-described third through tenth exemplary embodiments, an example is illustrated in which the stopper grooves 22, 92, 102 are formed at the fender liner 19 and the stopper groove 32 is formed by the rear spats 30, 62 and the rocker 11 or is formed at the rear spats 72, 82. However, the present invention is not limited to the same, and, for example, the guide surfaces 34 and the stopper surface 36 (i.e., the stopper groove 32) may be formed at the front end portion of the rocker 11, or, for example, in a structure provided with a mud guard, the stopper grooves 22, 32 may be formed at the mud guard.

DESCRIPTION OF THE REFERENCE NUMERALS

10 fixed aerodynamic stabilizer (wheel house structure for vehicle)
11 rocker (vehicle body structural member)
14A standing wall portion (vehicle body structural member)
15 front wheel (wheel)
16 wheel house
19 fender liner (vehicle body structural member)
20 fixed aerodynamic stabilizer (wheel house structure for vehicle)
21 wheel house structure for vehicle
22•32 stopper groove (width direction groove)
24 guide groove wall (inclined groove wall)
26 stopper groove wall (airflow collision groove wall)
34 guide surface (inclined groove wall)
36 stopper surface (airflow collision groove wall)
40 guide groove (peripheral direction)
45 rear wheel (wheel)
46•50•60•70•80•90•100 wheel house structure for vehicle
52•54 rib
92•102 stopper groove (width direction groove)

The invention claimed is:

1. An aerodynamic structure for a vehicle, comprising a step portion provided in a wheel house at a vehicle body longitudinal direction rear side of a rotational axis of a wheel within the wheel house, the step portion including:
   an airflow collision groove wall that faces downward in a vehicle body vertical direction; and
   an airflow guiding wall that extends downward in the vehicle body vertical direction from a rear end portion of the airflow collision groove wall in a vehicle body longitudinal direction.

2. The aerodynamic structure for a vehicle of claim 1, wherein the step portion is provided along a vehicle width direction, and is disposed at the vehicle body longitudinal direction rear side of the wheel.

3. The aerodynamic structure for a vehicle of claim 2, wherein a peripheral direction groove that opens toward an outer peripheral surface of the wheel is provided along a peripheral direction of the wheel house from a vehicle body longitudinal direction front side or a vehicle body vertical direction upper side portion with respect to the width direction groove or the step portion at the inner surface side of the wheel house, to a front end side of the wheel house.

4. The aerodynamic structure for a vehicle of claim 3, wherein an opening edge at a vehicle body longitudinal direction rear side or a vehicle body vertical direction lower side at the peripheral direction groove is positioned at a vehicle body longitudinal direction front side or a vehicle body vertical direction upper side, with respect to an opening edge at a vehicle body longitudinal direction front side or a vehicle body vertical direction upper side at the width direction groove.

5. The aerodynamic structure for a vehicle of claim 1, wherein the step portion is formed as a width direction groove that opens toward the wheel side, due to the airflow guiding wall being inclined so that a bottom end thereof in the vehicle body vertical direction is nearer to the wheel than a top end thereof.

6. The aerodynamic structure for a vehicle of claim 5, wherein both vehicle width direction ends of the width direction groove are closed.

7. The aerodynamic structure for a vehicle of claim 5, wherein the width direction groove is structured by a plurality of unit width direction grooves that are separated by ribs in a vehicle width direction and are disposed in series in the vehicle width direction.

8. The aerodynamic structure for a vehicle of claim 5, wherein a plurality of the width direction grooves are provided along a peripheral direction of the wheel house.

9. An aerodynamic structure for a vehicle, comprising:
   an aerodynamic stabilizer for adjusting airflow that accompanies rotation of a wheel within a wheel house, the aerodynamic stabilizer including a step portion at a vehicle body longitudinal direction rear side of a rotational axis of the wheel within the wheel house;
   the step portion having a downward facing surface in a vehicle body vertical direction open to the wheel house, and having an upper facing surface in the vehicle body vertical direction positioned adjacent to a vehicle body structural member that extends along the vehicle body vertical direction, and
   the step portion further having an airflow guiding wall that extends downward in the vehicle body vertical direction from a rear end portion of the step portion in a vehicle body longitudinal direction.

10. The aerodynamic structure for a vehicle of claim 9, wherein the step portion is provided along a vehicle width direction, and is disposed at the vehicle body longitudinal direction rear side of the wheel.

11. The aerodynamic structure for a vehicle of claim 10, wherein a peripheral direction groove that opens toward an outer peripheral surface of the wheel is provided along a peripheral direction of the wheel house from a vehicle body longitudinal direction front side or a vehicle body vertical direction upper side portion with respect to the width direction groove or the step portion at the inner surface side of the wheel house, to a front end side of the wheel house.

12. The aerodynamic structure for a vehicle of claim 11, wherein an opening edge at a vehicle body longitudinal direction rear side or a vehicle body vertical direction lower side at the peripheral direction groove is positioned at a vehicle body longitudinal direction front side or a vehicle body vertical direction upper side, with respect to an opening edge at a vehicle body longitudinal direction front side or a vehicle body vertical direction upper side at the width direction groove.

13. The aerodynamic structure for a vehicle of claim 9, wherein the step portion is formed as a width direction groove that opens toward the wheel side, due to the airflow guiding wall being inclined so that a bottom end thereof in the vehicle body vertical direction is nearer to the wheel than a top end thereof.

14. The aerodynamic structure for a vehicle of claim 13, wherein both vehicle width direction ends of the width direction groove are closed.

15. The aerodynamic structure for a vehicle of claim 13, wherein the width direction groove is structured by a plurality of unit width direction grooves that are separated by ribs in a vehicle width direction and are disposed in series in the vehicle width direction.

16. The aerodynamic structure for a vehicle of claim 13, wherein a plurality of the width direction grooves are provided along a peripheral direction of the wheel house.

17. An aerodynamic structure for a vehicle, comprising a width direction groove that is provided along a vehicle width direction only at a vehicle body longitudinal direction rear side of a rotational shaft of a wheel at an inner surface side of a wheel house at whose inner side the wheel is disposed, and that opens toward the wheel,
the width direction groove being structured to have:
a guide groove wall inclined from an edge portion of an open end that faces the wheel at the width direction groove, toward a downstream side in a direction of rotation of the wheel, so as to gradually move away from an outer peripheral surface of the wheel; and
an airflow collision groove wall extending from an end portion side that is away from the outer peripheral surface of the wheel at the guide groove wall, toward another edge portion of the open end,
wherein the width direction groove is provided at a vehicle body longitudinal direction rear end side at the wheel house and has the guide groove wall that extends rearward in a vehicle body longitudinal direction and upward in a vehicle body vertical direction from a vehicle body vertical direction bottom edge at the open end of the width direction groove, and the airflow collision groove wall that extends frontward in the vehicle body longitudinal direction from a top rear end of the guide groove wall.

18. The aerodynamic structure for a vehicle of claim 17, wherein both vehicle width direction ends of the width direction groove are closed.

19. The aerodynamic structure for a vehicle of claim 17, wherein the width direction groove is structured by a plurality of unit width direction grooves that are separated by ribs in a vehicle width direction and are disposed in series in the vehicle width direction.

20. The aerodynamic structure for a vehicle of claim 17, wherein a plurality of the width direction grooves are provided along a peripheral direction of the wheel house.

21. The aerodynamic structure for a vehicle of claim 17, wherein a peripheral direction groove that opens toward an outer peripheral surface of the wheel is provided along a peripheral direction of the wheel house from a vehicle body longitudinal direction front side or a vehicle body vertical direction upper side portion with respect to the width direction groove or the step portion at the inner surface side of the wheel house, to a front end side of the wheel house.

22. The aerodynamic structure for a vehicle of claim 21, wherein an opening edge at a vehicle body longitudinal direction rear side or a vehicle body vertical direction lower side at the peripheral direction groove is positioned at a vehicle body longitudinal direction front side or a vehicle body vertical direction upper side, with respect to an opening edge at a vehicle body longitudinal direction front side or a vehicle body vertical direction upper side at the width direction groove.

23. An aerodynamic structure for a vehicle, comprising a width direction groove that is provided along a vehicle width direction at a portion that is positioned rearward, in a vehicle body longitudinal direction, of a wheel at an inner surface side of a wheel house at whose inner side the wheel is disposed, and that opens toward the wheel,
wherein the width direction groove has a guide groove wall that is inclined such that the guide groove wall extends rearward in a vehicle body longitudinal direction and upward in a vehicle body vertical direction from a vehicle body vertical direction bottom edge at an open end of the width direction groove, and an airflow collision groove wall that extends frontward in the vehicle body longitudinal direction from a top rear end of the guide groove wall.

24. The aerodynamic structure for a vehicle of claim 23, wherein both vehicle width direction ends of the width direction groove are closed.

25. The aerodynamic structure for a vehicle of claim 23, wherein the width direction groove is structured by a plurality of unit width direction grooves that are separated by ribs in a vehicle width direction and are disposed in series in the vehicle width direction.

26. The aerodynamic structure for a vehicle of claim 23, wherein a plurality of the width direction grooves are provided along a peripheral direction of the wheel house.

27. The aerodynamic structure for a vehicle of claim 23, wherein a peripheral direction groove that opens toward an outer peripheral surface of the wheel is provided along a peripheral direction of the wheel house from a vehicle body longitudinal direction front side or a vehicle body vertical direction upper side portion with respect to the width direction groove or the step portion at the inner surface side of the wheel house, to a front end side of the wheel house.

28. The aerodynamic structure for a vehicle of claim 27, wherein an opening edge at a vehicle body longitudinal direction rear side or a vehicle body vertical direction lower side at the peripheral direction groove is positioned at a vehicle body longitudinal direction front side or a vehicle body vertical direction upper side, with respect to an opening edge at a vehicle body longitudinal direction front side or a vehicle body vertical direction upper side at the width direction groove.

* * * * *